United States Patent
Sugimoto et al.

(10) Patent No.: US 6,609,441 B1
(45) Date of Patent: Aug. 26, 2003

(54) INDEXING DEVICE

(75) Inventors: Kenji Sugimoto, Tokorozawa (JP); Hiroshi Shinohara, Tokorozawa (JP); Wolfgang Pfeifer, Esslingen (DE)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/647,601

(22) PCT Filed: Apr. 7, 1998

(86) PCT No.: PCT/JP98/01593
§ 371 (c)(1),
(2), (4) Date: Oct. 3, 2000

(87) PCT Pub. No.: WO99/51391
PCT Pub. Date: Oct. 14, 1999

(30) Foreign Application Priority Data

| Dec. 13, 1996 | (JP) | ............................................. 8-03656 |
| Dec. 13, 1996 | (JP) | ............................................. 8-03660 |
| Dec. 13, 1996 | (JP) | ............................................. 8-03661 |

(51) Int. Cl.$^7$ .......................... B23B 29/00; B23B 9/00
(52) U.S. Cl. ................... 74/813 L; 82/159; 82/120; 82/121; 74/826; 74/813 R
(58) Field of Search ........................ 74/813 R–813 L; 82/120, 121, 118, 1.11; 29/26 A

(56) References Cited

U.S. PATENT DOCUMENTS

| 4,038,891 A | * | 8/1977 | Zaninelli .................... 82/36 A |
| 4,413,539 A | | 11/1983 | Ishizuka et al. ................. 82/2 |
| 4,550,631 A | * | 11/1985 | Yamazaki et al. ............. 74/822 |
| 4,558,611 A | | 12/1985 | Boffelli ........................ 74/826 |
| 4,998,958 A | * | 3/1991 | Chun et al. .................... 83/133 |
| 5,455,993 A | | 10/1995 | Link et al. ..................... 29/40 |
| 5,642,650 A | * | 7/1997 | Roote et al. ................... 82/126 |
| 5,730,691 A | | 3/1998 | Tokura et al. ................. 483/56 |
| 5,735,029 A | | 4/1998 | Panetta ......................... 29/40 |
| 5,842,392 A | * | 12/1998 | Pfeifer et al. ................. 82/1.11 |
| 5,960,676 A | * | 10/1999 | Pfeifer et al. ............. 74/813 C |
| 6,016,729 A | * | 1/2000 | Pfeifer et al. ................. 82/121 |
| 6,257,109 B1 | * | 7/2001 | Shinohara et al. ........... 82/1.11 |
| 6,257,111 B1 | * | 7/2001 | Shinohara et al. ............ 82/120 |

FOREIGN PATENT DOCUMENTS

| JP | 42-4193 | 2/1967 |
| JP | 57-20088 | 4/1982 |
| JP | 58-77434 | 5/1983 |
| JP | 5-138410 | 6/1993 |
| JP | 5-261605 | 10/1993 |

* cited by examiner

Primary Examiner—Vinh T. Luong
(74) Attorney, Agent, or Firm—Finnegan, Henderson, Farabow, Garrett & Dunner, L.L.P.

(57) ABSTRACT

A turret tool rest (14) includes a turret (24) movably supported on a base (22), on which desired tools can be mounted at predetermined indexable angled positions. A pair of coupling elements (66, 68), which can be engaged with each other, are arranged between the base (22) and the turret (24). The coupling elements (66, 68) are moved between an engaged position at which they are mutually engaged to fixedly hold the turret at respective indexed positions on the base, and a disengaged position at which they are mutually disengaged to permit the turret to be rotationally indexed. A spring-loaded plunger unit (80) serves to prevent the turret (24) from freely rotating on the base (22), until the coupling elements (66, 68) are fully engaged with each other, during the moving operation of the coupling elements between the engaged and disengaged positions. The plunger unit (80) includes a plunger (84) retractably provided on the turret, a countersink (90) fixedly provided on the base to be engaged with the plunger when the turret is located at the engaged position, and a coil spring (86) or biasing the plunger to maintain the engagement between the plunger and the countersink.

7 Claims, 12 Drawing Sheets

INDEXING DEVICE

TECHNICAL FIELD

The present invention relates to an indexing device used for a machine tool, and particularly to an indexing device including a rotary unit rotatably supported on a base, and a plurality of engaging elements provided between the rotary unit and the base, the engaging elements being relatively movable between an engaged position at which the rotary unit is fixedly held at respective indexed positions on the base and a disengaged position at which the rotary unit is permitted to be rotationally indexed. The present invention may be applied, for example, to a turret tool rest provided for an automatically operated lathe. However, this is not exclusive and other applications are also allowed.

BACKGROUND ART

In a field of machine tools, an indexing device is used for locating a tool or a workpiece at predetermined positions for the purpose of automating the machining operation, increasing the machining speed as well as providing for multi-kind production of a small number of items. As this type of the indexing device, a turret tool rest for selecting a desired tool from a number of tools previously mounted thereon at regular intervals in a circumferential direction and locating the same at a predetermined working position, an index table for locating a desired objective surface to be machined of a workpiece at a predetermined working position to allow automatic multiple-surface machining of the workpiece, and so on, have been known.

The turret tool rest used for an automatically operated lathe, which is one rotary type indexing device, has a structure wherein a turret, as a rotary unit mounted on a base, rotates to automatically index a plurality of (usually five to twelve) indexed positions. A plurality of tool mounting portions are formed on an outer circumferential or axial end surface of the turret in correspondence to the indexed positions various tools including a cutting tool, a drill, etc., can be mounted onto the tool mounting portions. One of these tools suitable for the desired machining operation is automatically selected and located at a predetermined working position on the automatic lathe by the indexing rotation of the turret. In this regard, the term "axial direction" used in this text stands for the direction along a rotation axis or a central axis of an object.

While the workpiece is cut or drilled by the selected tool in the turret tool rest, it is necessary to firmly secure the turret on the base at the indexed position. In most cases, even in other indexing devices, it is required to firmly secure the rotary unit at the indexed position. Accordingly, a plurality of engaging elements are generally provided between the base and the rotary unit, which can be mutually engaged and disengaged (that is, a clamping and unclamping operation). By the mutual engagement or disengagement of these engaging elements, the rotary unit is made free, to be rotationally indexed, or is securely located at a predetermined indexed position.

In the field of conventional turret tool rests, a coupling unit comprising a pair of crown gear-shaped coupling elements, each having a number of teeth on one axial end face thereof, and adapted to be intermeshed with each other (this is called, for example, a curvic coupling) is used.

In this type of engaging unit, the engagement/disengagement is generally carried out by linearly displacing one engaging element (or rotating teeth) provided on the rotary unit in the axial direction relative to the other engaging element (or stationary teeth) provided on the base. Accordingly, when the rotary unit is to be rotationally indexed, the engaging element on the rotary unit is displaced in the axial direction from the engaged position, at which the engaging elements are engaged with each other, so as to release the engagement between the engaging elements (an unclamping operation), and the rotary unit is rotationally indexed at a disengaged position at which the engaging elements are completely disengaged from each other. After the indexing operation, the engaging element on the rotary unit is displaced again in the axial direction so as to engage the engaging elements with each other (a clamping operation), whereby the rotary unit is fixedly secured at the indexed position.

Generally, in the pair of engaging elements with the above structure, mutually opposed teeth in the axial direction have circumferentially opposite, slanted lateral faces for facilitating the mutual engagement/disengagement by the axial movement. In this case, until the engaging elements are completely engaged, i.e., the slanted lateral faces of the opposed teeth closely contact with each other, a gap is inevitably defined between the slanted lateral faces of the teeth, whereby the engaging elements cannot be fixedly secured to each other. Thus, a positional displacement may be generated in a rotational direction between the engaging elements within a rotational angle until the teeth are abutted to each other, which may allow the rotary unit to freely rotate on the base.

In the turret tool rest, for example, when a weight imbalance exists in the rotary unit relative to the rotation axis, due to, e.g., the deviated arrangement of tools in the tool mounting portions in the turret, the abovesaid free rotation of the turret is liable to occur due to the gap formed between the slanted lateral faces of the opposed teeth, before the pair of coupling elements are completely engaged.

Also, in general, the indexing device is adapted so that the rotary unit is operatively coupled to a rotationally indexing drive source, so as to be capable of receiving a driving force from the drive source, when the engaging elements are completely disengaged from each other to allow the relative rotation. It will be understood, in view of the above, that there might be a possibility of relative positional displacement in the rotational direction even if the teeth of the engaging elements have lateral faces parallel to the axis, instead of the slanted lateral faces as mentioned above, immediately after the engaging elements have been disengaged from each other.

If such a positional displacement in a rotating direction repeatedly occurs every time the engaging elements mutually engage or disengage, there might be a risk of wear or breakage of a number of teeth of the engaging elements due to the relative sliding or collision therebetween. Because the engaging elements must have a highly accurate positioning function for performing the precise rotational indexing, it is required that positional displacement in the rotational direction should be prevented as much as possible.

DISCLOSURE OF THE INVENTION

An object of the present invention is to provide an indexing device comprising a rotary unit and a plurality of engaging elements for fixedly supporting the rotary unit at indexed positions, which can prevent the engaging elements from shifting in the rotational direction to each other while they are moving between a mutually engaged position and a mutually disengaged position until the mutual engagement has completed, whereby wear and breakage of the engaging elements are effectively avoidable.

To achieve the above object, the present invention provides an indexing device comprising a base; a rotary unit movably supported on the base; at least two engaging elements provided in respective association with the base and the rotary unit and engageable with each other; drive means for rotationally indexing the rotary unit on the base, and for moving the at least two engaging elements between an engaged position at which the at least two engaging elements are engaged with each other to fixedly hold the rotary unit at respective indexed positions on the base and a disengaged position at which the elements are disengaged from each other to enable the rotary unit to be rotationally indexed; and rotation inhibiting means for inhibiting the rotary unit from freely rotating on the base during a moving operation of the at least two engaging elements between the engaged position and the disengaged position.

In a preferred aspect, the rotation inhibiting means comprises at least one movable projection retractably provided on the rotary unit, at least one engaging portion fixedly provided on the base to be engaged with the movable projection when the rotary unit is located at the indexed position, and biasing means for biasing the movable projection in a direction for maintaining an engagement of the movable projection with the engaging portion.

In this arrangement, it is advantageous that the movable projection includes an outwardly convexly curved end surface, and that the engaging portion comprises a countersink provided on a surface of the base so as to receive the end surface of the movable projection.

Also, it is desirable that the movable projection comprises a plunger axially slidably supported in a sleeve provided in the rotary unit.

Preferably, the biasing means comprises a spring.

Advantageously, the rotation inhibiting means further comprises a friction member provided between the base and the rotary unit.

In another preferred aspect, the at least two engaging elements comprise a plurality of stationary teeth fixedly provided on the base and a plurality of rotary teeth fixedly provided on the rotary unit, and the drive means linearly moves the rotary unit along a rotation axis of the rotary unit on the base, so as to move the stationary teeth and the rotary teeth between the engaged position and the disengaged position.

In this arrangement, it is advantageous that the stationary teeth and the rotary teeth have respective slanted lateral faces capable of being closely contacted with each other, and that the rotation inhibiting means inhibits the rotary unit from freely rotating on the base during the moving operation of the stationary teeth and the rotary teeth between the engaged position at which the slanted lateral faces of the stationary teeth and the rotary teeth are closely contacted with each other and the disengaged position at which the slanted lateral faces are disengaged from each other to an extent allowing rotation of the rotary teeth without interfering with the stationary teeth.

Also, it is preferred that the rotation inhibiting means comprises at least one plunger axially slidably supported in a sleeve provided in the rotary unit and including an outwardly convexly curved axial end surface, at least one countersink provided securely on a surface of said base to receive the axial end surface of the plunger when the rotary unit is located at the indexed position, and a spring for biasing the plunger in a direction for maintaining an engagement of the axial end surface of the plunger with the countersink.

Further, the present invention provides a turret tool rest comprising a base; a turret movably supported on the base, on which desired tools, including a rotating tool, can be mounted at predetermined indexable angled positions; a first servo motor for driving the rotating tool; a pair of clutch pieces, one of which is operatively connected to the first servo motor and the other of which is operatively connected to the turret; a pair of coupling elements provided in respective association with the base and the turret and engageable with each other; a second servo motor for moving the pair of clutch pieces between an operative position at which the clutch pieces are engaged with each other and transmit a driving force of the first servo motor to the turret so as to rotationally index the turret and a nonoperative position at which they are disengaged from each other so as to separate the turret from the first servo motor, and for moving the pair of coupling elements between an engaged position at which the coupling elements are engaged with each other and hold the turret in respective indexed positions on the base and a disengaged position at which they are disengaged from each other to permit the turret to be rotationally indexed; an interlocking mechanism for interlocking the clutch piece with the coupling element in operation, so that the pair of coupling elements move to the engaged position when the pair of clutch pieces move to the non-operative position, and the pair of coupling elements move to the disengaged position when the pair of clutch pieces move to the operative position; and rotation inhibiting means for inhibiting the turret from freely rotating on the base during moving operations of the pair of clutch pieces between the non-operative position and the operative position and simultaneously of the pair of coupling elements between the engaged position and the disengaged position; wherein the rotation inhibiting means comprises at least one movable projection retractably provided on the turret, at least one engaging portion fixedly provided on the base to be engaged with the movable projection when the turret is located at the indexed position, and biasing means for biasing the movable projection in a direction for maintaining an engagement of the movable projection with the engaging portion.

BRIEF DESCRIPTION OF THE DRAWINGS

The above and other objects, features and advantages of the present invention will be described with reference to the embodiments shown in the attached drawings, wherein.

BEST MODES FOR CARRYING OUT THE INVENTION

Figure 1:
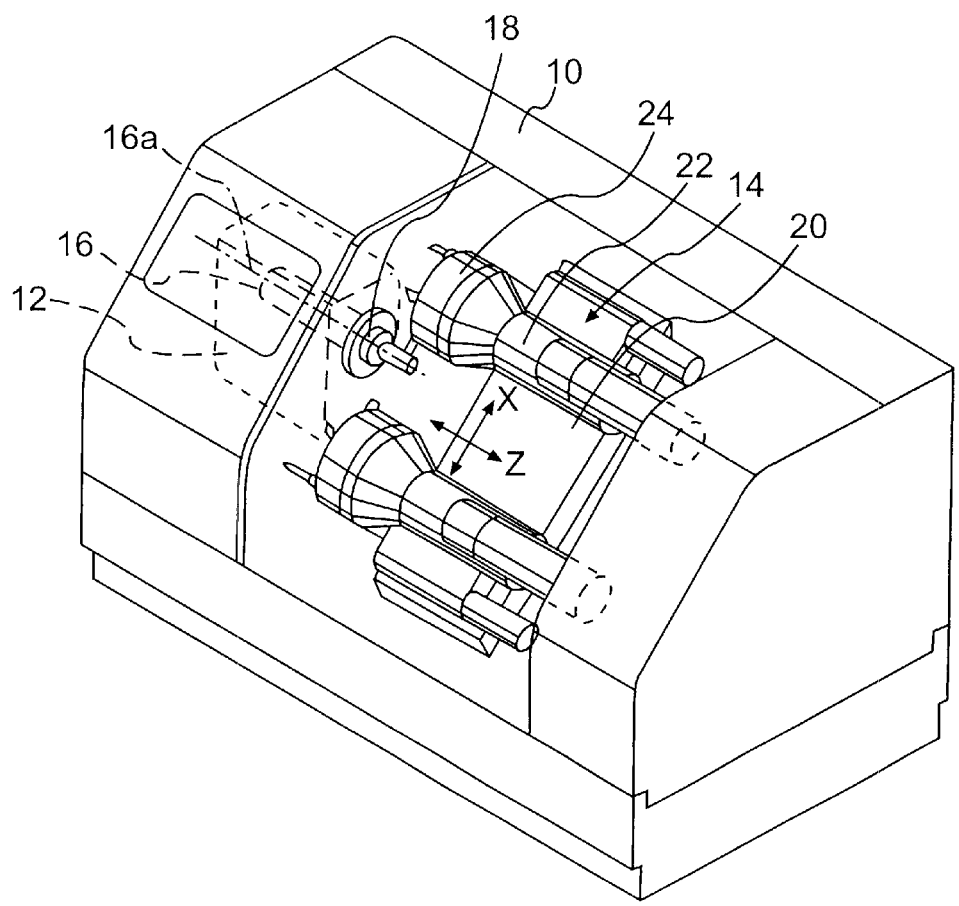
FIG. 1 is a schematic perspective view of an automatic lathe provided with a turret tool rest, to which an indexing device according to the present invention is applied.

With reference to the attached drawings, FIG. 1 schematically illustrates an automatically operated lathe provided with a turret tool rest as one application of an indexing device according to the present invention. Note that, in this text, the automatically operated lathe means any of cutting machine capable of carrying out the automatic cutting operation, such as an NC lathe. As shown in FIG. 1, the automatically operated lathe includes a lathe bed 10, a headstock 12 fixedly mounted on the lathe bed 10, and two turret tool rests 14 movably mounted on the lathe bed 10.

A rotary spindle 16, a spindle motor (not shown) for driving the rotary spindle 16, and so on are incorporated in the headstock 12, and a chuck 18 for securely gripping a workpiece w is attached to a distal end of the rotary spindle 16. The rotary spindle 16 is driven to rotate by the spindle motor, whereby the workpiece W is rotated about an axis 16a. In the illustrated automatic lathe, the axis 16a of the rotary spindle 16 is orientated in parallel to a Z-axis of a triaxial orthogonal coordinate system on the lathe bed 10.

The turret tool rest 14 is fixedly mounted onto a tool slide 20 disposed on the lathe bed 10. The tool slide 20 moves in a Z direction parallel to the axis 16a of the rotary spindle 16 and an x direction orthogonal to the axis 16a by a z-axial feed motor and an X-axial feed motor, not shown. Thus, the turret tool rest 14 cuts the workpiece W into a desired shape while moving together with the tool slide 20 in the Z direction and the x direction.

FIG. 2A illustrates, in section, the turret tool rest 14 as one embodiment of an indexing device according to the present invention. The turret tool rest 14 includes a base 22 fixedly supported on the tool slide 20 and a turret 24 supported by the base 22 in a rotatable and linearly movable manner. The tool slide 20 and the base 22 constitute a base of the indexing device according to the present invention, and the turret 24 constitutes a rotary unit of the indexing device.

The turret 24 includes a cylindrical base portion 24a having a smaller diameter and a head portion 24b having a larger diameter and radially integrally extending from an axial front end (a left end in the drawing) of the base portion 24a. In the outer circumferential region of the head portion 24b of the turret 24, a plurality of tool mounting portions 26 are provided at every predetermined indexable angled position about the rotation axis O of the turret 24. A cutting tool 30 (see FIG. 2B) attached to a tool holder 28 or a rotating tool 34, such as a drill, attached to another tool holder 32 can be mounted to the tool mounting portions 26 via the tool holders 28 and 32.

As shown in FIG. 2B, the tool holder 28 of the cutting tool 30 is located at a desired indexable angled position by inserting at extension 28a formed on one side of the holder into a mounting hole 26a formed in a desired tool mounting portion 26 of the turret 24, and is firmly secured to the tool mounting portion 26 by a fastener such as a bolt, not shown.

On the other hand, the tool holder 32 for the rotating tool 34 is located at a desired indexable angled position by inserting an extension 32a formed on one side of the holder into a mounting hole 26a formed in another desired tool mounting portion 26 of the turret 24, and is firmly secured to the tool mounting portion 26 by a fastener such as a bolt, not shown.

Further, the tool holder 32 incorporates therein a tool rotating shaft 36 rotatably extending through a center of the extension 32a and a power transmission mechanism (not shown) associated with the tool rotating shaft 36, and provided with a tool chuck 38 for gripping the rotating tool 34 at a distal end of the power transmission mechanism. At a tip end of the tool rotating shaft 36, projecting from the extension 32a, a tool rotating gear 40 is secured.

The mounting hole 26a of each tool mounting portion 26 is formed in the axial direction through the larger diameter head portion 24b of the turret 24. Thus, when the tool holder 32 is properly mounted to the desired tool mounting portion 26, the tool rotating gear 40 secured to the tool rotating shaft 36 is disposed beyond a rear end surface (a right end in the drawing) of the head portion 24b of the turret 24.

In this regard, the tool mounting portions 26 and mounting structures for various tools in the turret 24 are not be limited to the above ones, but can include any other type of tool mounting portion and mounting structure for various tools generally used in the turrets of machine tools.

The smaller diameter base portion 24a of the turret 24 is received in a slidable manner within a cylindrical slide bearing 42 formed in a hollow portion 22a of the base 22. Thereby, the turret 24 is mounted onto the base 22 to be rotationally indexable about the rotation axis O as well as linearly movable along the rotation axis O. In the illustrated embodiment, the rotation axis O extends in parallel to the axis 16a of the spindle 16

A ball screw 44 is disposed rotatably and coaxially with the turret 24 relative to the rotation axis O via a rolling bearing 46 within the hollow portion 22a of the base 22. At a proximal end of the ball screw 44 is fixed a power transmission gear 48.

A coupling drive motor 50 (hereinafter merely referred to a's a coupling motor 50) constituted as a servo motor is mounted onto the base 22. Although not shown, a drive gear operatively connected to the power transmission gear 48 is attached to a rotary shaft of the coupling motor 50. The torque of the coupling motor 50 is transmitted via the drive gear and the power transmission gear 48 to the ball screw 44 so-as to rotate the ball screw 44.

A nut 52 is screwed onto the ball screw 44, and is fixed to the base 24a of the turret 24. Thus, as the ball screw 44 rotates, the nut 52 linearly moves along the rotation axis O, and the turret 24 linearly moves along the rotation axis O together with the nut 52. In such a manner, the ball screw 44 and the nut 52 constitutes a feed screw mechanism 54 for the linear motion of the turret 24.

An annular space is defined between a front end surface (a left end in the drawing) 22b of the base 22 and a rear end surface of the head portion 24b of the turret 24, and an annular bearing attachment member 56, a bearing 58 and a ring gear 60 are disposed, in this space, coaxially with the turret 24 relative to the rotation axis O.

Figure 3:
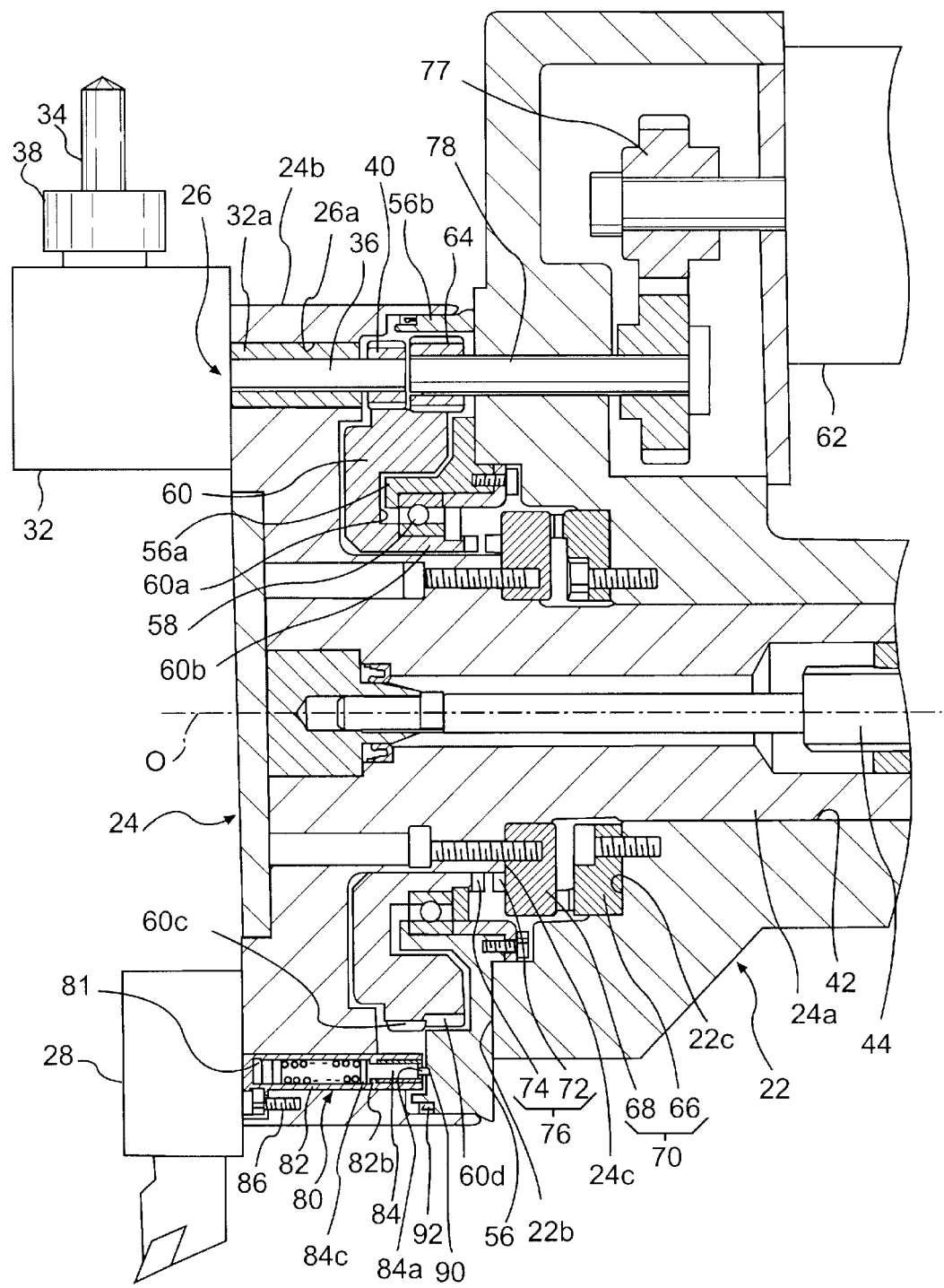
FIG. 3 is an enlarged sectional view showing the turret type tool rest of FIG. 2A, at a completely clamped position for the turret.

As shown in FIG. 3 in an enlarged manner, the bearing attachment member 56 includes a cylindrical sleeve portion 56a surrounding the base 24a of the turret 24 in a non-contact manner and a flange portion 56b integrally extending from the sleeve portion 56a in the radial direction, and is secured in close contact with the front end surface 22b of the base 22 by a fastener such as a bolt, not shown.

The bearing 58 is, for example, a deep groove bearing, an outer ring of which is fixedly attached to the inner circumferential surface of the sleeve portion 56a of the bearing attachment member 56.

The ring gear 60 is disposed between the bearing attachment member 56 and the head portion 24b of the turret 24 in a manner as not to be in contact with them, and surrounds the base 24a of the turret 24 in a non-contact manner. An annular recess 60a is provided on a rear end surface (a right end in the drawing) of the ring gear 60, and the sleeve portion 56a of the bearing attachment member 56 and the bearing 58 are inserted into the recess 60a. An inner ring of the bearing 58 is fixedly attached to the outer circumferential surface of an inner wall 60b defining the recess 60a on the rear end surface of the ring gear 60.

The ring gear 60 is thus attached to the base 22, through the bearing 58 and the bearing attachment member 56, so as to be rotatable but not movable in the axial direction. On the outer circumferential surface of the ring gear 60, a number of teeth 60c are formed, which can be intermeshed with the tool rotating gear 40 fixed to the tool rotating shaft 36 of the tool holder 32 for the rotating tool 34 described above. In addition, on the outer circumferential surface of the ring gear 60, a number of teeth 60d are formed and arranged side-by-side with the teeth 60c in the axial direction, which can be intermeshed with a gear 64 for transmitting a driving force of an indexing motor 62 described later.

The hollow portion 22a of the base 22 has a shoulder 22c annularly formed on the inner wall surface of the base 22, so that a larger diameter portion is defined in an axially front end region (a left end in the drawing) relative to the shoulder 22c as a boundary. An annular coupling element 66 for base is fixed to the front surface of the shoulder 22c of the base 22. The base portion 24a of the turret 24 also has a shoulder 24c annularly formed on the outer circumferential surface of the base portion, so that a somewhat larger diameter portion is defined in an axially front end region relative to the shoulder 24c as a boundary, that is, in a region of the head portion 24b. An annular coupling element 68 for turret is fixed to a rear surface of the shoulder 24c of the turret base portion 24a. Thereby, the base side coupling element 66 and the turret side coupling element 68 are arranged opposite to each other in the axial direction. In this regard, the coupling elements 66 and 68 constitute engaging elements of the indexing device according to the present invention.

Figure 4:
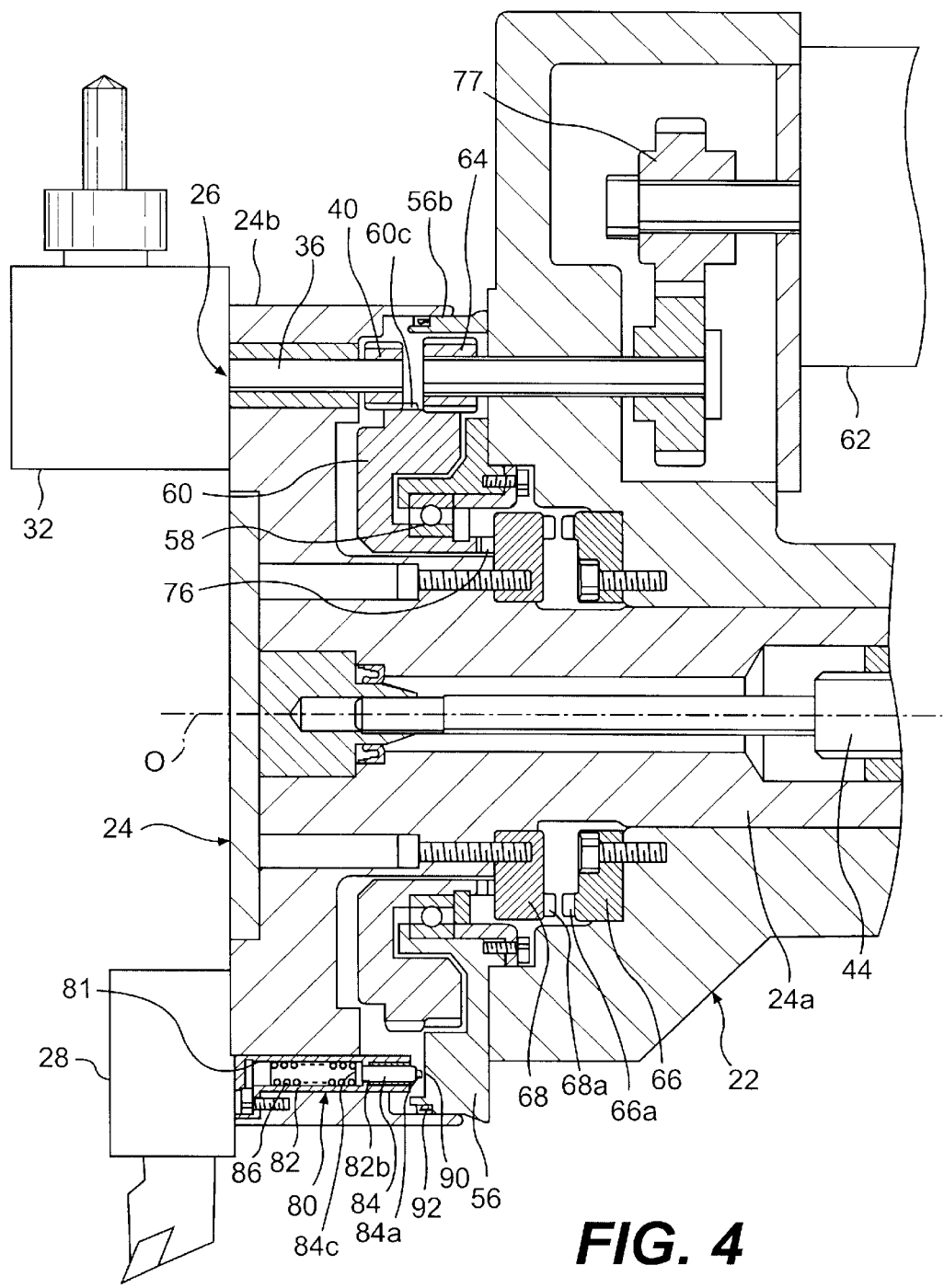
FIG. 4 is an enlarged sectional view showing the turret tool rest of FIG. 2A, at a completely unclamped position for the turret.

The coupling elements 66, 68, having a structure similar to a crown gear, includes a number of teeth 66a, 68a capable of being intermeshed with each other on one axial end surfaces thereof, facing oppositely to each other (see FIG. 4). Accordingly, the coupling elements 66, 68 constitute a coupling unit 70 in which the elements are mutually engageable and disengageable (that is, a clamping/unclamping operation) as the turret 24 moves linearly in the axial direction. In the coupling unit 70, the teeth 66a of the base side coupling element 66 define stationary teeth, while the teeth 68a of the turret side coupling element 68 define rotary teeth. The coupling unit 70 of this type is similar in structure to a so-called curvic coupling.

Figure 5A:
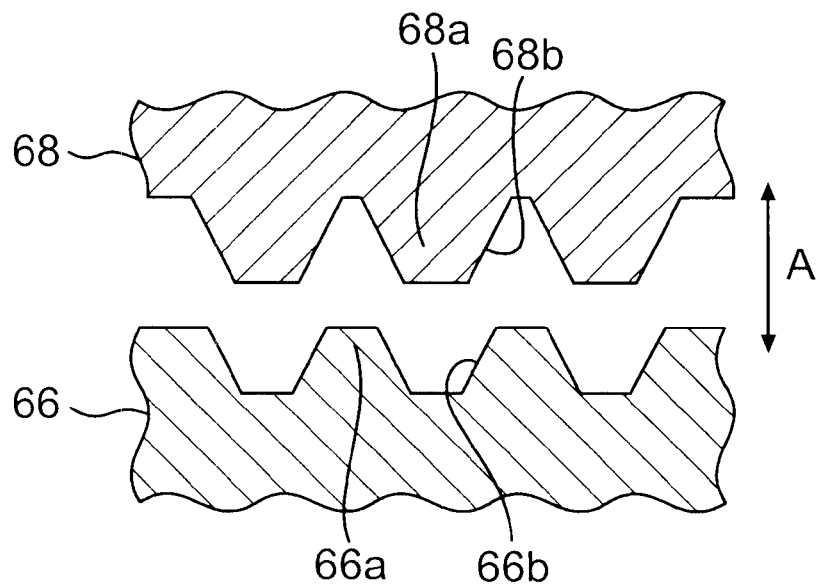
FIG. 5A is a partially enlarged sectional view showing a teeth shape of a pair of coupling elements located at the completely unclamped position.
Figure 5B:
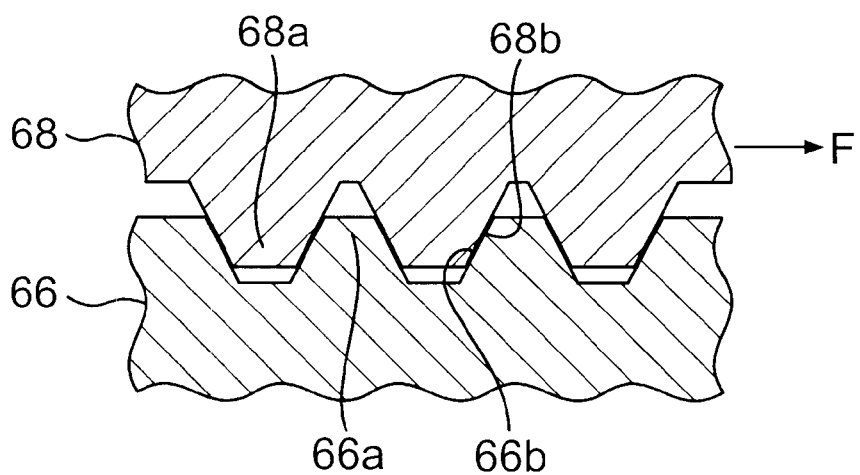
FIG. 5B is a partially enlarged sectional view showing a teeth shape of a pair of coupling elements located at the completely clamped position.

As schematically shown in FIGS. 5A and 5B, the teeth 66a, 68a of the coupling elements 66, 68 respectively have oppositely arranged, slanted lateral faces 66b and 68b, and are formed in a constant pitch identical to each other. When the turret 24 linearly moves in the axial direction along the rotation axis O, the turret side coupling element 68 fixed to the turret 24 also moves in the direction shown by an arrow A, whereby the teeth 66a of the base side coupling element 66 are intermeshed with or released from the opposed teeth 68a of the turret side coupling element 68.

Further, on an axial front end surface of the turret side coupling element 68, or an opposite side to the teeth 68a, a clutch piece 72 having a number of teeth, similar to a crown gear, is integrally formed (see FIG. 3). On the other hand, the ring gear 60 described above is provided with a clutch piece 74 also having a number of teeth, similar to a crown gear, on a rear end of the inner wall 60b (see FIG. 3). The clutch piece 72 provided in the turret side coupling element 68 and the clutch piece 74 provided in the ring gear 6 are opposed to each other in the axial direction, to constitute a clutch unit 76 in which the pieces are engageable with and disengageable from each other as the turret 24 linearly moves in the axial direction.

The teeth in the clutch pieces 72, 74 respectively have oppositely arranged, slanted lateral faces 66b and 68b, and are formed in a constant pitch identical to each other, in the similar way to the teeth 66a, 68a of the coupling elements 66, 68. Due to the movement of the turret side coupling element 68 according to the axial linear movement of the turret 24 along the rotation axis O, the teeth on the opposed clutch pieces 72, 74 are mutually intermeshed with or released from each other.

As described above, the coupling unit 70 and the clutch unit 76 are constructed in such a manner that when one of them is in the intermeshed state, the other is in the released state. In other words, in the state illustrated in FIGS. 2A and 3, the base side coupling element 66 is intermeshed with the turret side coupling element 68 in the coupling unit 70 while the clutch pieces 72, 74 in the clutch unit 76 are released from each other. On the other hand, in the state illustrated in FIG. 4, the coupling elements 66, 68 in the coupling unit 70 are released from each other while the clutch pieces 72, 74 in the clutch unit 76 are intermeshed with each other.

FIG. 3 is an enlarged view of the turret tool rest 14 shown in FIG. 2A, and illustrates it in the engagement position or a completely clamped position, wherein the coupling elements 66, 68 in the coupling unit 70 have been engaged with each other to inhibit the rotation of the turret 24 about the rotation axis O. In the completely clamped position, a desired tool mounted to the turret 24 is located at a working position where the tool is capable of machining the workpiece W (FIG. 2A), and the turret 24 is firmly and fixedly held in this state by the intermeshing between the coupling elements 66, 68. The completely clamped position, i.e., the intermeshing state of the coupling elements 66, 68, is maintained by the low output power of the coupling motor 50.

In this regard, the above-described indexing motor 62, which is a servo motor other than the coupling motor 50, is mounted on the base 22. A rotary shaft of the indexing motor 62 is operatively coupled via a gear train 77 to a shaft 78 extending through the base 22 and the bearing attachment member 56, and the above-described gear 64 is fixed to a front end of the shaft 78. Thus, as already described, a driving force of the indexing motor 62 is transmitted to the ring gear 60 through the gear train 77, the shaft 78 and the gear 64, so that the ring gear 60 is driven to rotate.

In the completely clamped position shown in FIG. 3, the clutch pieces 72, 74 of the clutch unit 76 are released from each other, so that the driving force of the indexing motor 62 is not transmitted from the ring gear 60 to the turret 24. On the other hand, when the tool holder 32 for the rotating tool 34 is mounted to the tool mounting portion 26 of the turret 24, the ring gear 60 is intermeshed with the tool rotating gear 40 fixed to the tool rotating shaft 36 of the tool holder 32, as described above. Accordingly, if the rotating tool 34 is selected for machining the workpiece, the indexing motor 62 causes the tool rotating shaft 36 to rotate via the ring gear 60 at a high speed and thereby drives the rotating tool 34 to rotate, in a completely clamped position of FIG. 3.

From the state shown in FIG. 3, when the ball screw 44 is driven to rotate by the coupling motor 50 so as to linearly move the nut 52 and the turret 24 forward (leftward in the drawing) along the rotation axis O, the relative movement occurs between the base 22 and the turret 24 along the rotation axis O, so that the coupling elements 66, 68 of the coupling unit 70 are disengaged from each other. Immediately after the coupling unit 70 has completely been disengaged, the clutch pieces 72, 74 of the clutch unit 76 are intermeshed with each other.

FIG. 4 is an enlarged view of the turret tool rest 14 shown in FIG. 2A, and illustrates it in the completely unclamped position, at which the clutch pieces 72, 74 of the clutch unit 76 have been intermeshed with each other. In the completely unclamped position, the coupling unit 70 is in the disengaged position, while the driving force of the indexing motor 62 is transmitted from the ring gear 60 to the turret 24 via the clutch unit 76. Thus, the turret 24 is made to rotate by the indexing motor 62 at the completely unclamped position shown in FIG. 4.

As described above, in the turret tool rest 14, immediately after the coupling unit 70 has completely been disengaged, the clutch unit 76 finishes the intermeshing (or completely unclamps), and immediately after the clutch unit 76 has completely been disengaged, the coupling unit 70 finishes the intermeshing (or completely clamps).

With reference again to FIGS. 5A and 5B, it will be understood that, when the coupling elements 66, 68 are intermeshed with each other, the coupling elements 66, 68 can generate a positional displacement in the rotational direction therebetween, until they reach the completely clamped position where the slanted lateral faces 66b, 66b of the opposed teeth 66a, 68a tightly contact with each other as shown in FIG. 5B, due to a gap inevitably defined between the lateral faces 66b, 68b of the opposed teeth 66a, 68a. Such a positional displacement may occur during the time-when the coupling elements 66, 68 are mutually disengaged from the completely clamped position and the clutch pieces 72, 74 of the clutch unit 76 reach the completely unclamped position shown in FIG. 4 at which the slanted lateral faces of the opposed teeth thereof tightly contact with each other.

The positional displacement of the coupling elements 66, 68 in the rotational direction is liable to occur when a weight imbalance exists in the turret 24 relative to the rotation axis O, for example, due to the deviated arrangement of tools in the tool mounting portions 26 in the turret 24. If the positional displacement occurs every time the coupling unit 70 engages and disengages, there might be a risk of wear or breakage of the teeth 66a, 68a of the coupling elements 66, 68 due to the relative sliding or collision therebetween. Because the coupling elements 66, 68 are elements which must have a highly accurate positioning function for performing the precise rotational indexing, the above-described positional displacement in the rotational direction should be prevented as much as possible.

For this purpose, a rotation inhibiting means is provided, in the turret tool rest 14, to inhibit the free rotation of the turret 24 about the rotation axis O, until the coupling unit 70 and the clutch unit 76 reach the completely clamped position and the completely unclamped position.

Figure 6:
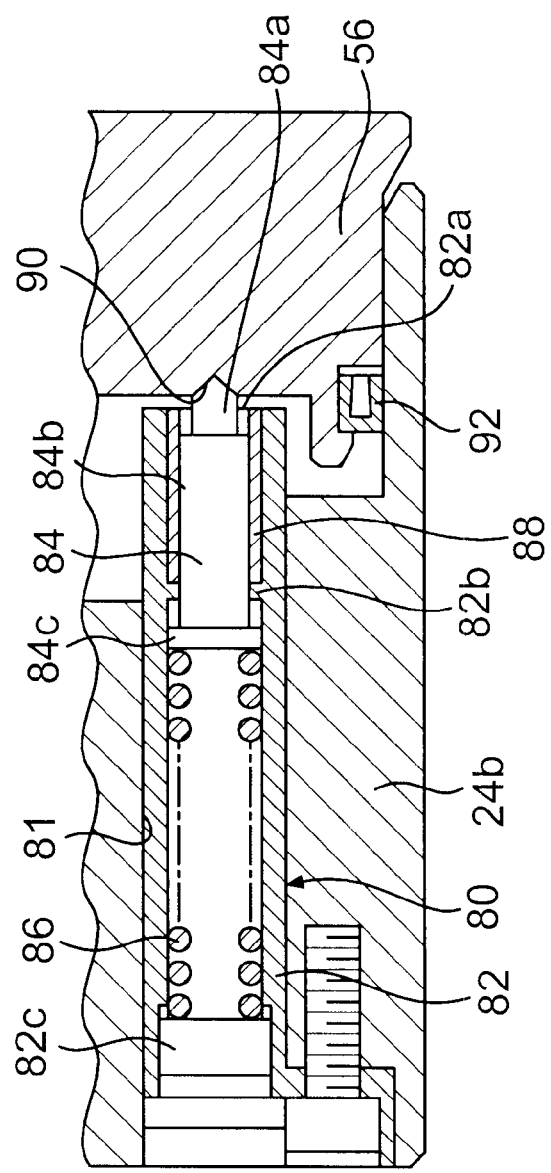
FIG. 6 is a partially enlarged sectional view showing rotation inhibiting means of the turret tool rest located at the completely clamped position of FIG. 3.

As shown in FIGS. 2A to 4, the rotation inhibiting means is provided in the outer circumferential edge region of the head portion 24b of the turret 24 with a spring/plunger unit 80, located at a desired position independently from the tool mounting portions 26. As illustrated in FIG. 6 in an enlarged manner, the spring/plunger unit 80 includes a sleeve 82 fixed to a receiving hole 81 formed through the turret head portion 24b in the axial direction independently from the mounting holes 26a of the tool mounting portions 26, a movable projection or plunger 84 held within the sleeve 82 to be slidable in the axial direction, and biasing means or coil spring 86 for biasing the plunger 84 in such a direction as to have a distal end 84a thereof project from an end opening 82a of the sleeve 82.

The end opening 82a of the sleeve 82 is positioned to project from a rear end surface of the head portion 24b of the turret 24. On the inner circumferential surface of the sleeve 82, a rib 82b is projected radially inward at a position away, at a predetermined distance, from the end opening 82a in the axial direction. The other axial end of the sleeve 82 is closed by a lid 82c, and the coil spring 86 is accommodated in a space between the rib 82b and the lid 82c.

The plunger 84 includes a cylindrical body 84b, a distal end 84a extending from the body 84b in the axial direction and having an outwardly convex axial end surface, and a proximal end 84c extending radially from the body 84b to form a flange. The proximal end 84c of the plunger 84 is disposed between the rib 82b of the sleeve 82 and the lid 82c, and receives the biasing force of the coil spring 86.

The plunger 84 is movable in the axial direction in such a manner that the body 84b thereof does not interfere with the rib 82b of the sleeve 82, but is inhibited in its axial movement by the abutment of the proximal end 84c to the rib 82b at a predetermined axial direction. To enable the plunger 84 to accurately move in the axial direction, a slide bearing member 88 for slidably support the body 84b of the plunger 84 is provided between the end opening 82a and the rib 82b of the sleeve 82.

On the other hand, the bearing attachment member 56 fixed to the front end surface 22b of the base 22 is provided on an axial front end surface thereof with countersinks 90 capable of receiving the distal end 84a of the plunger 84 in the spring/plunger unit 80. The countersinks 90 constitute an engagement portion which is one component of the rotation inhibiting means, and are provided on the axial front end surface of the bearing attachment member 56 at every angular positions indexed in correspondence with the indexing angle of the turret 24. Accordingly, when the turret 24 is at a desired rotationally indexed position, the distal end 84a of the plunger 84 is axially aligned with a desired countersink 90.

The operation of the rotation inhibiting means having the above structure will be described below. Initially, at the completely clamped position shown in FIGS. 3 and 3B, the turret 24 is in the desired rotationally indexed position, and the distal end 84a of the plunger 84 of the plunger unit 80 is securely received in the desired countersink 90 of the bearing attachment member 56. At this time, the distal end 84c of the plunger 84 is pushed into a position, away, by a predetermined distance, from the rib 82b of the sleeve 82, against the biasing force of the coil spring 86.

When the turret 24 starts to move from the completely clamped position along the rotation axis O, the coupling elements 66, 68 of the coupling unit 70 begin to disengage from each other, whereby a gap is formed between the slanted lateral faces of the opposed teeth 66a, 68a. At this instant, since the plunger 84 of the spring/plunger unit 80 moves in the axial direction along the sleeve 82 due to the biasing force of the coil spring 86 until the proximal end 84c abuts to the rib 82b of the sleeve 82, the distal end 84a of the plunger 84 is held in the condition where it is fixedly received in the countersink 90. Thus, the free rotation of the turret 24 is inhibited, and the positional displacement of the coupling elements 66, 68 in the rotational direction as well as the positional displacement of the clutch pieces 72, 74 in the clutch unit 76 in the rotational direction are prevented.

In this manner, the distal end 84a of the plunger 84 continues to be received in the countersink 90 during the time when the proximal end 84c moves from the pushed position in the completely clamped position shown in FIG. 3 to a position at which it abuts to the rib 82b of the sleeve 82. During this period, the turret 24 moves in the axial direction from the completely clamped position shown in FIG. 3 to a state immediately before the completely unclamped position shown in FIG. 4, i.e., a state immediately before the slanted lateral faces of the Ad opposed teeth of the clutch pieces 72, 74 in the clutch unit 76 tightly contact with each other. Thereby, the free rotation of the turret 24 is inhibited until the coupling unit 70 has reached a substantially completely disengaged state, which prevents the positional displacement of the coupling elements 66, 68 and of the clutch pieces 72, 74 in the rotational direction.

When the turret 24 further moves in the axial direction, the plunger 84 also moves together with the sleeve 82 in correspondence to the movement of the turret 24, and the distal end 84a of the plunger 84 is released from the countersink 90. When the distal end 84a of the plunger 84 is moved to be slightly spaced from the axial front end surface of the bearing attachment member 56, the opposed teeth of the clutch pieces 72, 74 in the clutch unit 76 are brought into tight contact with each other on the slanted lateral faces thereof, so that the turret 24 reaches the completely unclamped position shown in FIGS. 4 and 5A.

Thus, the free rotation of the turret 24 is inhibited by the rotation inhibiting means during the time when the turret 24 moves from the completely clamped position to the substantially completely unclamped position, whereby the positional displacement of the coupling elements 66, 68 and of the clutch pieces 72, 74 in the rotational direction can be prevented. AS a result, the wear or breakage of the coupling elements 66, 68 and the clutch pieces 72, 74 is effectively avoided.

The effect of the rotation inhibiting means is also obtained in substantially the same manner during the time when the turret 24 moves from the completely unclamped position to the completely clamped position. In this case, however, there is a possibility in that the turret 24 slightly freely rotates by an angle corresponding to a gap between the opposed teeth of the clutch pieces 72, 74, during a short time from the beginning of the disengagement of the clutch pieces 72, 74 in the clutch unit 76 to the completion of the fitting of the distal end of the plunger 84 into the countersink 90. In this case, the slight positional displacement in the rotational direction can be corrected when the distal end of the plunger 84 fits into the countersink 90, and thereby the coupling elements 66, 68 can accurately intermesh.

As apparent from the above description, even by using the rotation inhibiting means, a condition may arise wherein the turret 24 is enabled to slightly freely rotate during the axial movement of the turret 24 for a very short distance and time, from the condition where the distal end 84a of the plunger 84 in the spring/plunger unit 80 begins to disengage from the countersink 90, to the completely unclamped position. Such a free rotation occurring in the very short time could be reduced as much as possible, by, e.g., a frictional force generated from a seal member 92 provided, for preventing dust from entering, between the head portion 24b of the turret 24 and the bearing attachment member 56 fixed to the base 22.

The turret tool rest 14 having the above-described structure may be variously modified and changed within a scope of the present invention. For example, in place of the plunger 84 in the spring/plunger unit 80, a rigid ball may be employed, which is biased by the coil spring 86. Also, in place of the coil spring 86, other springs such as a coned disk spring may be adopted.

The feed screw mechanism 54 constituted from the ball screw 44 and the nut 52 may be arranged in reverse to the above-described arrangement, that is, the nut 52 is disposed on the drive side and the ball screw 44 is disposed on the driven side. In this case, the ball screw 44 is fixed to the turret 24, and the nut 52 adapted to be rotatable but immobile in the axial direction is coupled to the coupling motor 50. When the nut 52 rotates, the ball screw 44 linearly moves, and the turret 24 moves together with the ball screw 44 along the rotation axis O.

In the case where a low frictional structure or a high feeding accuracy is not required for the feed screw mechanism 54, an ordinary screw may be used instead of the ball screw 44. In this case, to prevent the driven side turret 24 from rotating under the influence of the torque of the coupling motor 50, the above-described rotation inhibiting means operates effectively.

Moreover, a so-called Hirth coupling may be applied as a coupling unit 70, instead of the so-called curvic coupling described above. Also, a well-known coupling structure having three engaging elements may be employed. Further, in place of the coupling elements 66, 68, a friction coupling (or a brake) having a sufficient braking force, or a shot pin type positioning structure, may be adopted.

Figure 2:
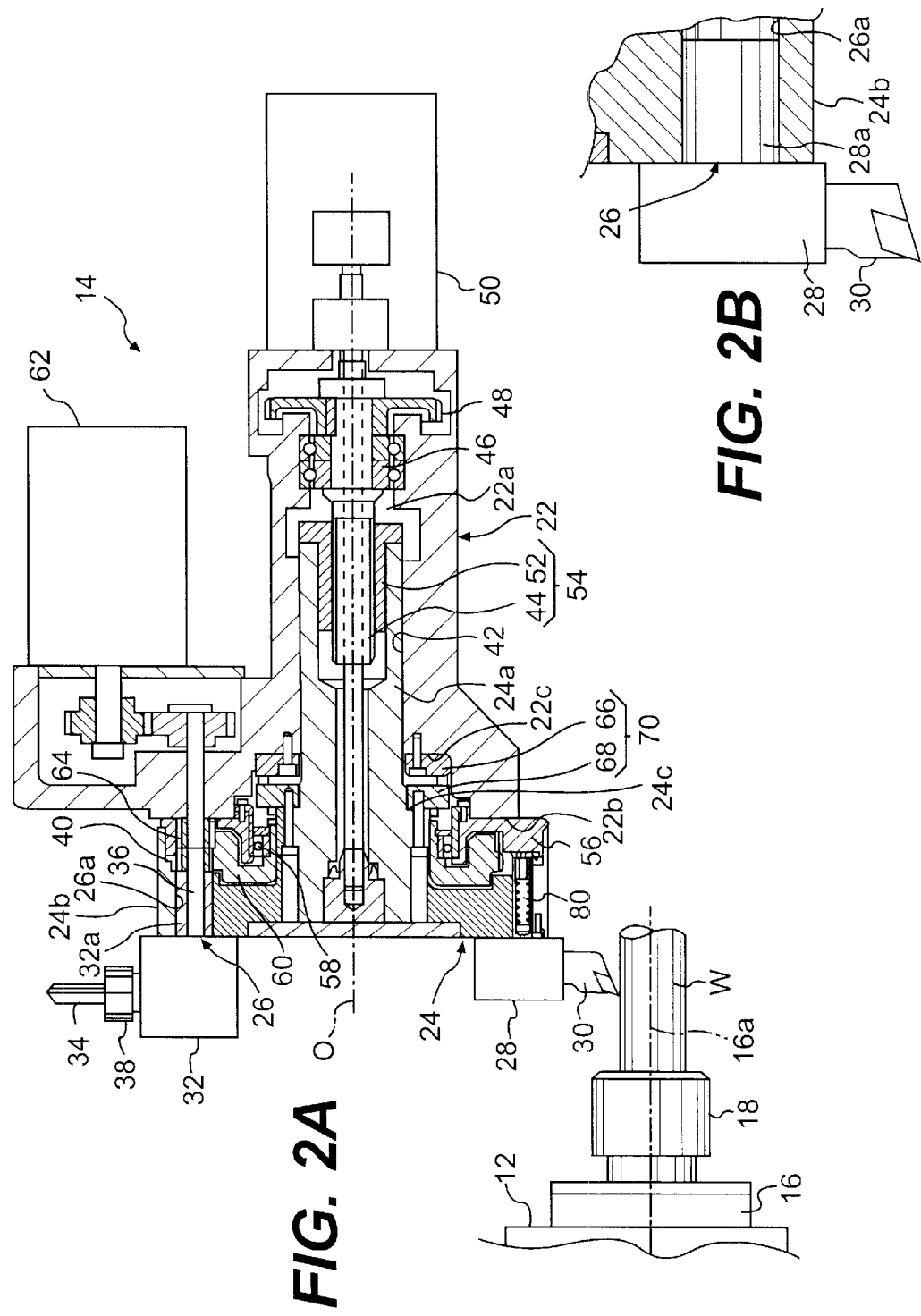
FIG. 2A is a longitudinal diametric cross-section of a turret tool rest as one embodiment of an indexing device according to the present invention, together with a workpiece mounted onto a headstock of an automatic lathe.
FIG. 2B is a partially enlarged sectional view of one tool mounting portion of the turret tool rest shown in FIG. 2A.
Figure 7A:
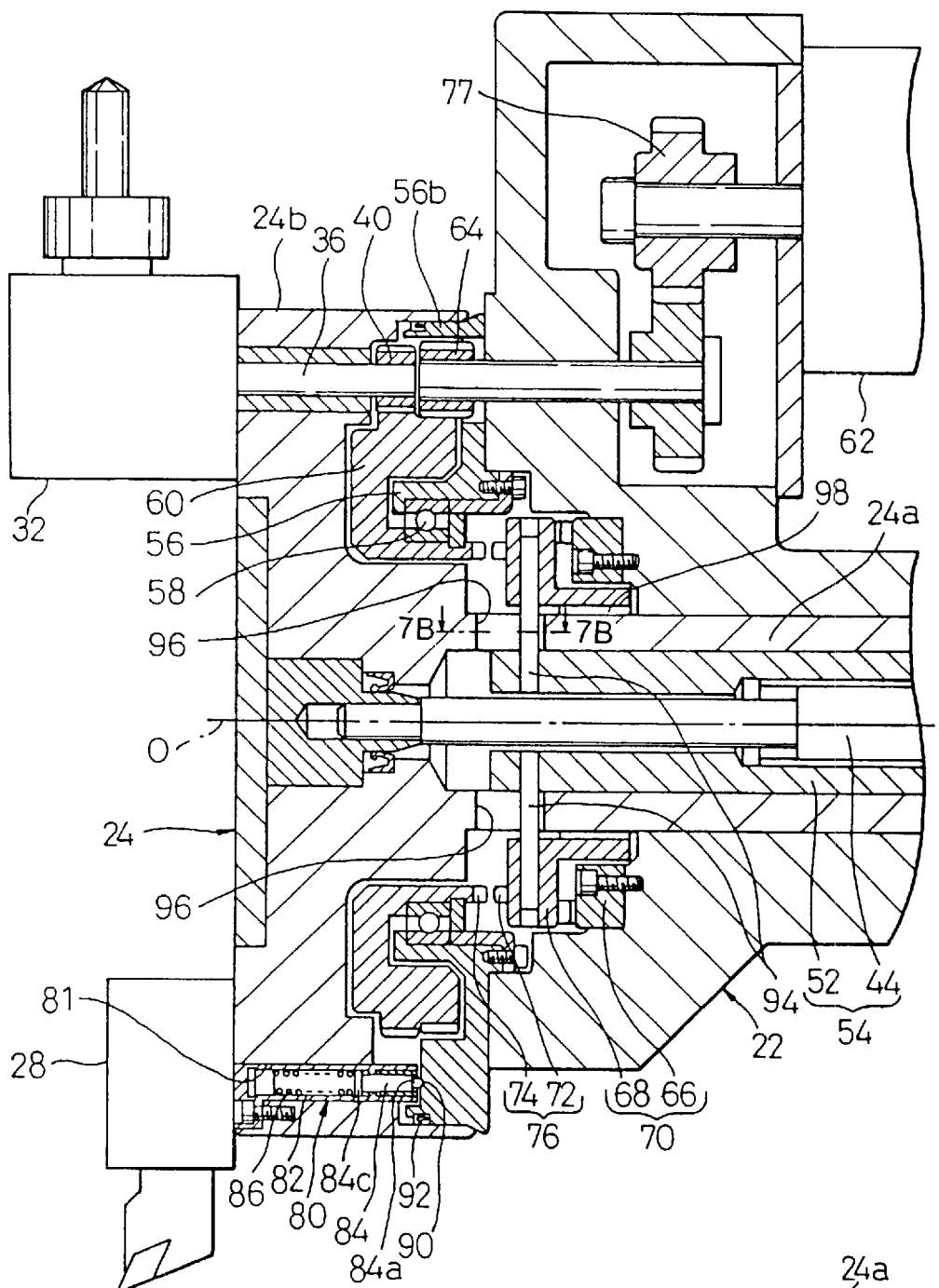
FIG. 7A is an enlarged sectional view illustrating a modification of the turret tool rest of FIG. 2A at the completely clamped position for the turret.

FIG. 7A shows in cross-section a modification of the turret tool rest 14 of FIG. 2A. In this regard, the same reference numerals are used for denoting the same or similar components as those in the turret tool rest 14 shown in FIGS. 2A to 6, and the detailed explanation thereof is eliminated.

The turret tool rest shown in FIG. 7A is different from the above-described turret tool rest 14 in a point that a turret 24 is immobile in the axial direction relative to a base 22 but solely performs an indexing rotation about the rotation axis O. To obtain this contruction, a nut 52 of a feed screw mechanism 54 further extends forward in the axial direction (leftward in the drawing) through a base portion 24a of the turret 24, so that a front end region of the nut 52 is arranged at a position enabling it to radially overlap a turret side coupling element 68 of a coupling unit 70.

Figure 7B:
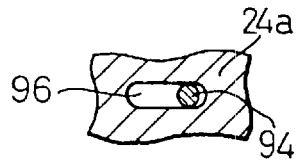
FIG. 7B is a partially enlarged sectional view taken along line 7B—7B in FIG. 7A.

In the front end region of the nut 52, a plurality (two in the drawing) of drive pins 94 extending radially outward are fixed. As shown in FIG. 7B, the drive pin 94 projects radially outward through an elongate hole 96 formed through the base portion 24a of the turret 24, and is fixedly coupled to the turret side coupling element 68.

The coupling element 68 is coupled to the base portion 24a of the turret 24 by splines 98 formed on the inner circumferential surface thereof to be slidable in the axial direction but not rotatable. On the front end surface of the coupling element 68, a clutch piece 72 is formed in the same manner as in the preceding embodiment.

In the turret tool rest of the above structure, when the ball screw 44 rotates due to a rotational driving force of the coupling motor 50 (see FIG. 2A), the nut screwed onto the ball screw 44 linearly moves along the rotation axis O. Since the linear movement of the nut 52 is transmitted to the coupling element 68 via the drive pin 94, the coupling element 68 linearly moves integrally with the nut 52 but independently from the turret 24 along the rotation axis O.

In a state shown in FIG. 7A, the coupling unit 70 is in a fully engaged state, and the turret 24 is in the completely clamped position. From this state, when the coupling element 68 is driven by the coupling motor 50 to move linearly leftward in FIG. 7A, the coupling element 68 is released from the base side coupling element 66, and the clutch piece 72 formed on a front surface of the coupling element 68 comes into mesh with a clutch piece 74 formed on a rear end edge of a ring gear 60.

After the turret 24 has been located at the completely unclamped position in this way, when the ring gear 60 is rotated by a rotational driving force of the indexing motor 62, the torque is transmitted to the turret 24 via the clutch pieces 72, 74, the coupling element 68 and the splines 98, so that the turret 24 can be rotationally indexed.

Further, when the coupling element 68 is driven to linearly move rightward in FIG. 7A from the completely unclamped position by the coupling motor 50, the clutch piece 72 is released from the clutch piece 74, and the coupling element 68 comes into mesh with the base side coupling element 66. Thereby, the turret 24 is firmly secured to the base 22 at a predetermined indexed position.

According to this arrangement, since the turret 24 cannot move in the axial direction during the clamp or unclamp operation in the rotational indexing process of the turret 24, there is no risk of mutual interference even if other objects, such as a workpiece or a spindle 16, exist in the vicinity of the periphery of the turret 24 and the tool. In addition, because the turret 24 is axially immobile relative to the base 22, the variation in the volume of a hollow space formed between the base 22 and the turret 24 and in the flow of air in the hollow space are substantially excluded, whereby a risk of ingress of dust into the hollow space is reduced Even in the turret tool rest having the above structure, the above-described rotation inhibiting means is effectively operative. In this case, the spring/plunger unit 80 maintains a state, irrespective of the clamping/unclamping operation of the coupling unit 70, wherein the distal end 84a of the plunger 84 is received in the desired countersink 90 in the bearing attachment member 56. Thereby, the free rotation of the turret 24 is inhibited between the clamping and unclamping operations, so that the positional displacement of the coupling elements 66, 68 and of the clutch pieces 72, 74 of the clutch unit 76 in the rotational direction is prevented, When the turret 24 indexingly rotates, the distal end 84a of the plunger 84 is forcibly released from the countersink 90 by a rotational force, and the plunger 84 is pushed into the sleeve 82 against a force of the coil spring 86. And, the turret 24 rotates as the distal end 84a of the plunger 84 slides on the front end surface of the bearing attachment member 56. When the turret 24 reaches a selected indexed position, the distal end 84a of the plunger 84 is automatically fitted into the corresponding countersink 90 by a force of the coil spring 86, so as to inhibit the free rotation of the turret 24 between the clamp/unclamp operations.

Figure 8:
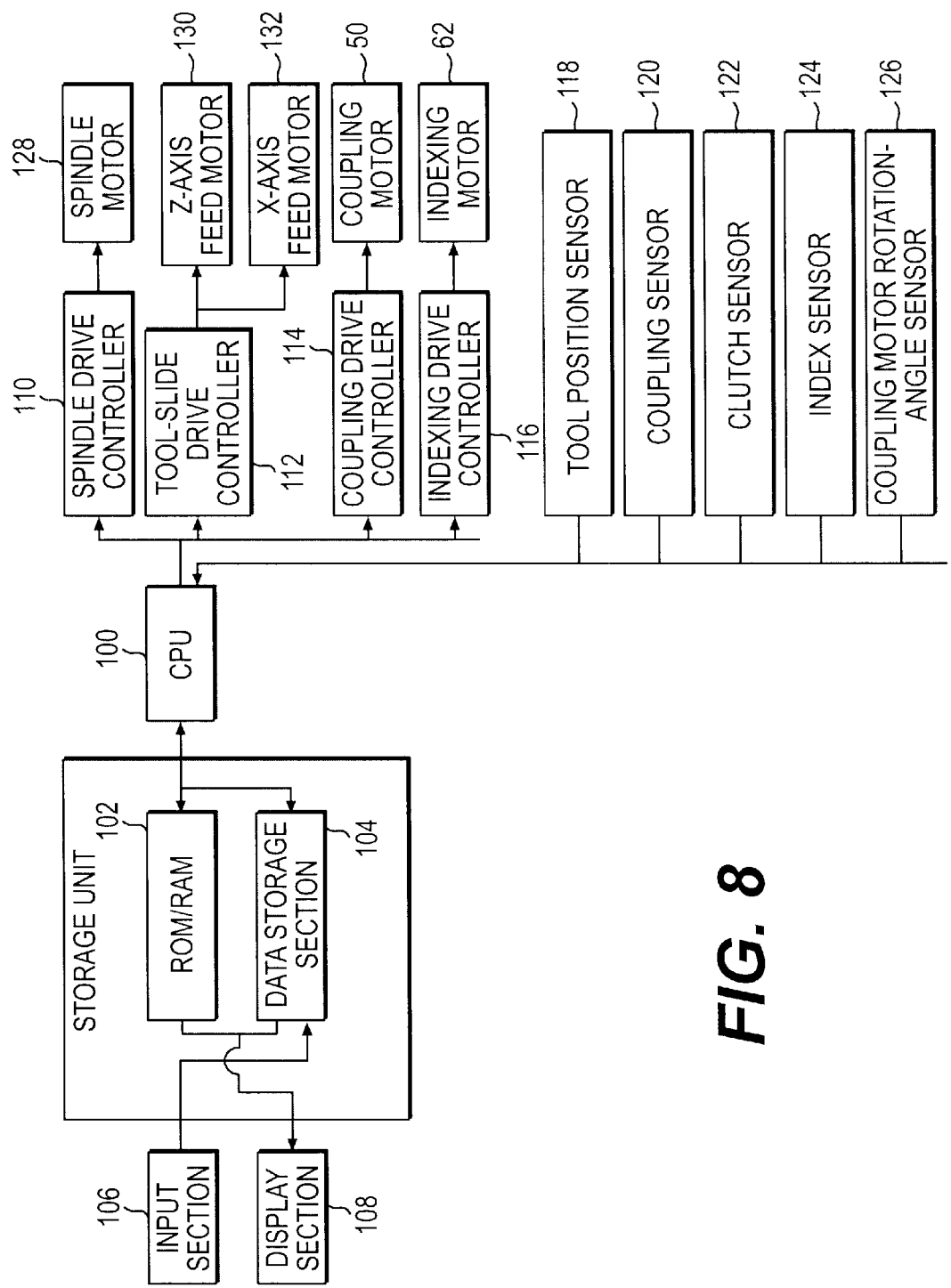
FIG. 8 is a block diagram of a control system for a spindle, a tool slide and a turret type tool rest of an automatic lathe provided with the turret tool rest of FIG. 2.

FIG. 8 is a block diagram of a control system for the headstock 12, the turret tool rest 14 and the tool slide 20 in an automatic lathe provided with the turret tool rest 14 according to the present invention.

As shown in FIG. 8, the control system for the headstock 12, the turret tool rest 14 and the tool slide 20 includes a central processing unit (CPU) 100, ROM/RAM 102, a data storage section 104, an input section 106, a display section 108, a spindle drive controller 110, a tool-slide drive controller 112, a coupling drive controller 114, an indexing drive controller 116, a tool position sensor 118, a coupling sensor 120, a clutch sensor 122, an index sensor 124, a coupling motor rotation-angle sensor 126 or others.

Control programs for driving the headstock 12, the turret tool rest 14 and the tool slide 20 are previously stored in the ROM/RAM 102. The CPU 100 controls the operation of the respective components of the headstock 12, the turret tool rest 14 and the tool slide 20 on the basis of the control programs. The input section 106 includes a keyboard or others, and data (selection of tools, shapes and dimensions of an article to be machined, rotational speeds of the spindle, or feed rates of the tool, etc.) necessary for controlling the operation of the respective components of the headstock 12, the turret tool rest 14 and the tool slide 20 are entered through the input section 106. These data may be input in an interactive manner, for example, by writing numerical values in a drawing displayed in the display section 108. In this case, the above control system constitutes an NC control system.

Various data necessary for controlling the drive of the headstock 12, the turret tool rest 14 and the tool slide 20, including the data entered via the input section 106, are stored in the data storage section 104.

The CPU 100 outputs predetermined commands on the basis of the control programs in the ROM/RAM 102 and tool selection data (that is, the indexed rotation of the turret) or machining data stored in the data storage section 104.

The spindle drive controller 110 operates a spindle motor 128 on the basis of a command from the CPU 100, to rotate the workpiece w gripped by the rotary spindle 16 in the headstock 12 about the axis 12a (FIG. 1). The workpiece W is machined into a desired shape by the cutting tool 30 attached to the turret tool rest 14 and, if necessary, by the rotating tool 34 driven by the indexing motor 62, due to the movement of the tool slide 20, on which the turret tool rest 14 is fixedly mounted, in the Z-axis direction and the X-axis direction on the lathe bed 10.

The tool-slide drive controller 112 operates Z-axis feed motor 128 and a X-axis feed motor 130, on the basis of a command from the CPU 100, to move the tool slide 20 on the lathe bed 10 in the Z-axis direction and in the X-axis direction.

The coupling drive controller 114 operates the coupling motor 50 on the basis of a command from the CPU 100, to engage and disengage the coupling elements 66, 68 of the coupling unit 70 with each other, for positioning and securing the turret 24 at a desired indexed position on the base 22, as well as to engage and disengage the clutch pieces 72, 74 of the clutch unit 76 with each other, for operatively coupling the turret 24 to the indexing motor 62.

The indexing drive controller 116 operates the indexing motor 62 on the basis of a command from the CPU 100, to indexingly rotate the turret 24 or rotate the rotating tool 34. In this regard, the rotating tool 34 is driven to rotate as the workpiece w is to be machined, while the turret 24 is driven to indexingly rotate as the tool is to be selected at the time between the machining processes of the workpieces W by various tools.

The tool position sensor 118 detects whether the turret tool rest 14 is placed at a position allowing tool selection when the turret 24 is required to indexingly rotate (i.e., a predetermined retreat position of the tool slide 20 at which the turret 24 can perform the indexing rotation without interfering with the workpiece W or the headstock 12; such a position is also referred to as a tool home position). Preferably, the position of the turret tool rest 14 is detected by the coordinates of a current position of the tool slide 20.

The coupling sensor 120 monitors the engaging or disengaging operation, of the coupling elements 66, 68 in the coupling unit 70, to detect the completion of the intermeshing between the coupling elements 66, 68. specifically, the increase in rotational torque of the coupling motor 50, caused by the completion of the intermeshing between the coupling elements 66, 68, is detected, whereby a coupling-completion signal is output to the CPU 100.

A clutch sensor 122 monitors the engaging or disengaging operation of the clutch pieces 72, 74 in the clutch unit 76, to detect the completion of the intermeshing between the clutch pieces 72, 74. Specifically, the increase in rotational torque of the coupling motor 50, caused by the completion of the intermeshing between the coupling elements 66, 68, is detected, whereby a clutch-completion signal is output to the CPU 100.

The indexing sensor 124 monitors a rotational angle of the indexing rotation of the turret 24, and outputs an indexing-completion signal to the CPU 100 when the is indexing rotation of an indicated angle has been completed.

During the time when the coupling unit 70 is at the clamp-completion position, the coupling motor rotation-angle sensor 126 monitors the rotation of the output shaft of the coupling motor 50. Thereby, the positional displacement forcibly generated between the coupling elements 66, 68 can be detected when the turret 24 is subjected to a load in the rotational direction due to the cutting resistance applied to the tool during the machining of the workpiece.

As described above, since the tool position sensor 118, the coupling sensor 120, the clutch sensor 122, the indexing sensor 124 and the coupling motor rotation-angle sensor 126, in the control system shown in FIG. 8, are of a type capable of outputting a signal by detecting the variation of a rotational position or a torque of a servo motor, there is no well-known position detecting sensor which is independent in structure. Of course, such a position detecting sensor may be adopted and, in this case, sensors other than the indexing sensor 124 and the coupling motor rotation-angle sensor 126 may be eliminated. Note, if the operational safety of the automatic lathe is taken into account, all the sensors described above are preferably provided.

In this regard, the relationship between forces acted on the slanted lateral faces 66b, 68b of the teeth 66a, 68a of the pair of coupling elements 66, 68 will be explained with reference to FIGS. 9A and 9B. For example, when the turret 24 is loaded in the rotational direction due to a cutting resistance applied on the tool during the machining of workpiece, a load F in the rotational direction of the coupling elements 66, 68, as shown in FIGS. 9A and 9B, is applied onto the slanted lateral faces 66b, 68b of the teeth 66a, 68a of the coupling elements 66, 68 meshed, with each other as shown in FIG. 5B.

Also, in addition to the circumferential load F, a pressing force P in the direction along the rotation axis O derived from the coupling motor 50 via the feed screw mechanism 54 and a frictional force W generated between the slanted lateral faces 66b, 68b are applied between the slanted lateral faces 66b, 68b of the meshed teeth 66a, 68a of the coupling elements 66, 68.

Figure 9A:
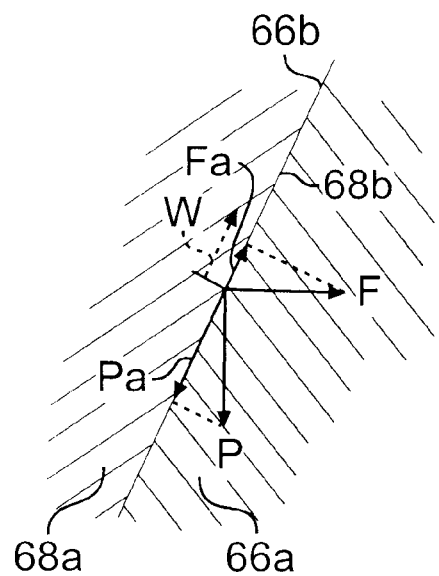
FIGS. 9A and 9B illustrate vectors of force acting on a slanted lateral face of a tooth of a coupling element.

As shown in FIG. 9A, if the load F in the rotational direction is small, so that a sum of the frictional force W and a component Fa thereof in the direction parallel to the slanted lateral faces 66b, 68b is smaller than a component Pa of the pressing force P in the direction parallel to the slanted lateral faces 66b, 68b, the teeth 68a of the turret side coupling element 68 tends to more forcibly enter a space between the teeth 66a of the base side coupling element 66 along the slanted lateral faces 66b, 68b, due to the component Pa of the pressing force P. As a result, the mesh between the coupling elements 66, 68 is firmly maintained.

Figure 9B:
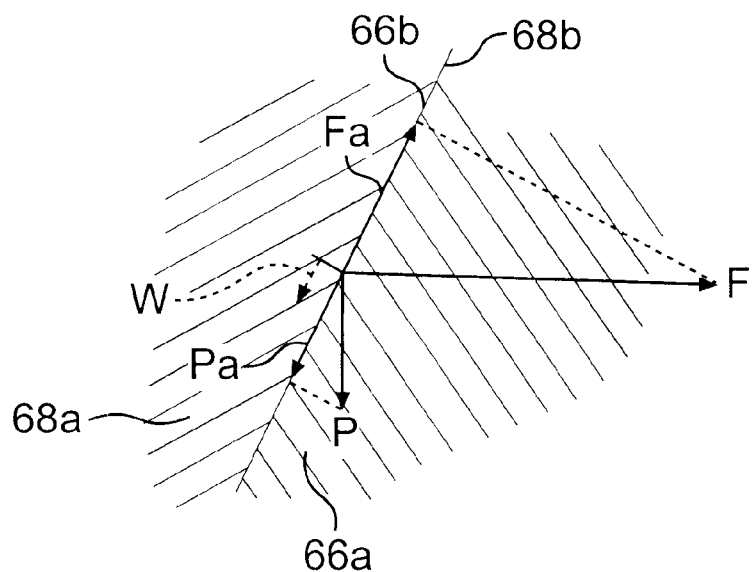

On the contrary, as shown in FIG. 9B, if the load F in the rotational direction is large, so that a component Fa of the load F in the direction parallel to the slanted lateral faces 66b, 68b is larger than a sum of the frictional force w and the component Pa of the pressing force P in the direction parallel to the slanted lateral faces 66b, 68b, the teeth 66a, 68a tend to slide along the slanted lateral faces 66b, 68b due to the component Fa of the load F, and thereby, the turret side coupling element 68 is lifted, while rotating, from the base side coupling element 66 in the axial direction. As a result, the turret 24 is lifted from the base 22 in the axial direction, and the coupling motor 50 reversely rotates via the feed screw mechanism 54.

Then, it is possible to detect the positional displacement generated between the coupling elements 66, 68 of the coupling unit 70 by detecting a rotation angle deviation θ of the output shaft caused by the reverse rotation of the coupling motor 50 via the feed screw mechanism 54 by using the rotation-angle sensor 126.

That is, if the coupling element 68 fixed to the turret 24 is subjected to a large circumferential load, to cause sliding between the slanted lateral faces 66b, 68b of the teeth 66a, 68a in the coupling elements 66, 68, the nut 52 linearly moves in the direction of the rotation axis O together with the turret 24, to rotate the ball screw 44 screwed with the nut 52. This rotation is transmitted to the coupling motor 50 via the power transmission gear 48, to cause the rotation angle deviation θ in the output shaft of the coupling motor 50. The rotation angle deviation θ is detected by the rotation-angle sensor 126.

In this regard, the pressure angle of the slanted lateral faces 66b, 68b of the teeth 66a, 68a in the coupling elements 66, 68 is preferably about 20 degrees. However, it is not limited thereto but may be properly adjusted in consideration of the functions required for the coupling elements 66, 68 in accordance with the application of the indexing device of the present invention. For example, when the pressure angle exceeds 20 degrees, the component Fa of the load F, shown in FIG. 9B, increases whereby the positional displacement is liable to occur between the coupling elements 66, 68.

Figure 10:
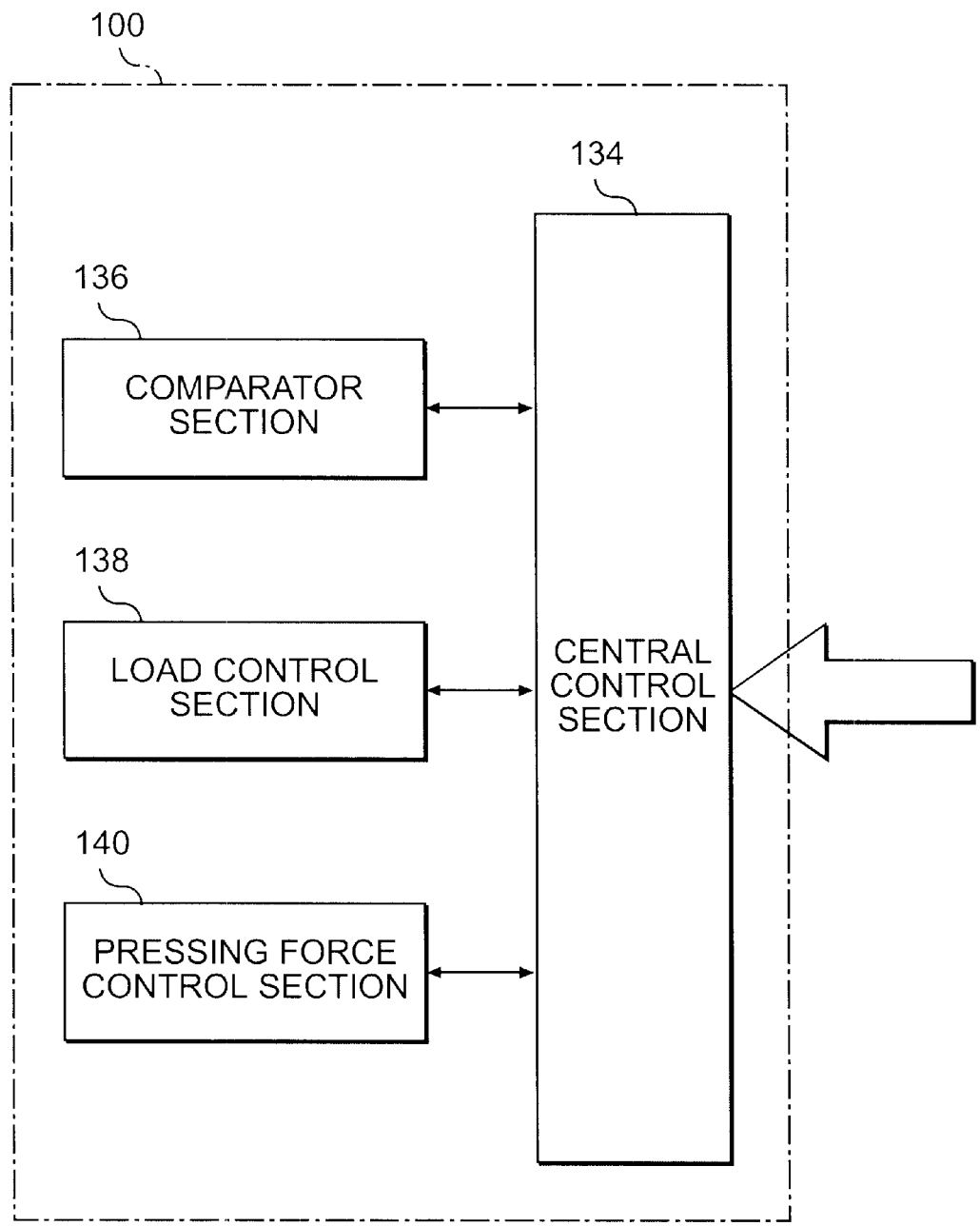
FIG. 10 is a block diagram of the detailed construction of CPU in the control system shown in FIG. 8.

FIG. 10 is a block diagram illustrating a more detailed construction of the CPU 100 in the control system shown in FIG. 8, and a method for detecting and correcting the above-described positional displacement will be described with reference to FIG. 10.

As shown in FIG. 10, the CPU 100 includes a central control section 134 for sending commands to the respective components of the control system as described above, a comparator section 136, a load control section 138 and a pressing force control section 140, which are described below.

A proper value and a tolerance limit value, regarding the positional displacement generating between the pair of coupling elements 66, 68; more concretely, a proper value θo and a tolerance limit value θmax of the rotation angle deviation θ, when the positional displacement is converted into the rotational angle deviation θ of the coupling motor 50; can be previously stored in the data storage section 104 shown in FIG. 8.

The comparator section 136 in the CPU has a function for comparing the proper value θo and the tolerance limit value θmax with the rotation angle deviation θ (or an amount of positional displacement) detected by the rotational angle sensor 126. The load control section 138 determines a difference between the rotation angle deviation θ and the proper value θo, on the basis of the comparison result from the comparator section 136, and outputs a control command, to the pressing force control section 140 via the central control section 134, for increasing or decreasing the pressing force applied from the coupling motor 50 to the pair of coupling elements 66, 68, in accordance with the difference. Alternatively, the load control section 138 outputs an excessive load signal if the rotation angle deviation θ exceeds the tolerance limit value θmax on the basis of the comparison result from the comparator section 136 to the central control section 134, upon which the central control section 134 outputs a load decreasing command to the tool slide drive controller 112.

The toll slide drive controller 112 decreases the feed rate of the cutting tool 30, which is a load source, or reduces a cutting depth of the workpiece, on the basis of the load decreasing command, to lower the cutting resistance, and to decrease the load applied to the turret 24 in the rotational direction. However, if the tolerance limit value θmax is selected at a threshold above which is a dangerous zone, it is preferred that the cutting tool 30 is immediately shifted away from the workpiece, to remove the load applied to the turret 24 in the rotational direction.

The pressing force control section 140 outputs a command, to the coupling motor 50 via the central control section 134 and the coupling drive controller 114, in accordance with the control command for increasing or decreasing a pressing force from the load control section 138, for increasing or decreasing an output torque of the coupling motor 50. Alternatively, the pressing force control section 140 can calculate a change rate dθ, for an elapsed time, of the positional displacement generating between the coupling elements 66, 68 (that is, the rotation angle deviation θ of the coupling motor 50) on the basis of the variation of the rotation angle of the output shaft of the coupling motor 50 continuously detected by the rotation-angle sensor 126, can determine whether the positional displacement tends to increase or decrease on the basis of the change rate dθ thus obtained, and can output a control command in accordance with the respective tendency to the coupling motor 50 via the central control section 134 and the coupling drive controller 114.

Regarding a drive current I for the coupling motor 50, it is preferred that an allowable maximum value Imax (a maximum output of the coupling motor 50) and an allowable minimum value Imin (a minimum output thereof) are previously stored in the data storage section 104, and that the coupling motor 50 is controlled in the tolerance range between Imax and Imin.

Figure 11:
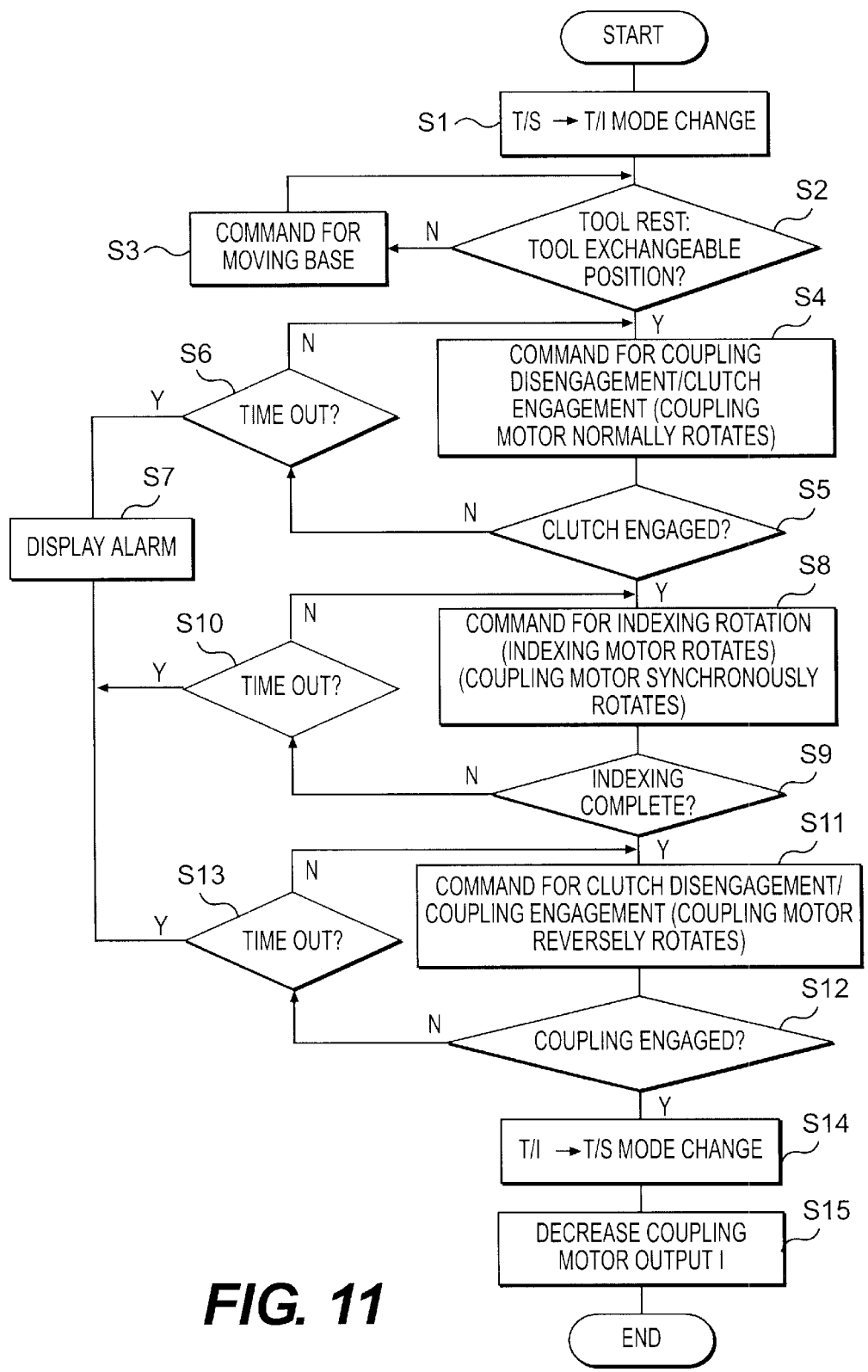
FIG. 11 is a flow chart illustrating the operation for controlling the tool slide and the turret tool rest by the control system shown in FIG. 8.

FIG. 11 illustrates a flow chart of the control process for performing the indexing rotation and positioning/fixing of the turret 24 as well as the rotation of the rotating tool 34, by means of the control system shown in FIG. 8 described with reference to the above embodiment. In this regard, this control process is mainly performed by commands from the CPU 100. Therefore, the control process described below will be explained with reference to the commands from the CPU 100.

In the turret tool rest 14, the indexing motor 62 is a drive source for driving the indexing rotation of the turret 24 and the high speed rotation of the rotating tool 35. Since the rotational speed and the rotational direction of the indexing motor 62 vary in correspondence to whether the turret 24 is driven or the rotating tool 34 is driven, the control of the indexing motor 62 is classified into two modes; one being a mode for rotationaly indexing the turret 24 (i.e., T/I mode) and the other being a mode for rotating at high speed the rotating tool 34 (i.e., TIS mode), and control programs corresponding to the respective modes are stored in the ROM/RAM 102.

First, when the indexing rotation of the turret 24 is performed for selecting a new tool after the cutting process by a certain tool has been completed, the control program for the indexing motor 62 is switched to the T/I mode after confirming the completion of the cutting process (S1).

Then, it is determined by a detection signal from the tool position detecting sensor 118 whether the turret tool rest 14 is located at the tool home position at which a required tool is selectable by the indexing rotation of the turret tool rest 14 (S2). If it is not located at the tool home position, a command signal is output to the tool slide drive controller 112 (S3), so as to move the tool slide 4 carrying the turret tool rest 14 thereon to the tool home position.

After confirming that the turret tool rest 14 is located at the tool home position, an operation signal is output to the coupling drive controller 114, so as to rotate the coupling motor 50 in the normal direction (S4). In this regard, the rotational direction of the coupling motor 50 in which the nut 52 in the feed screw mechanism 54 moves forward in the axial direction (leftward in FIG. 2) is referred to as "a normal direction".

A rotational driving force of the coupling motor 50 in the normal direction is transmitted to the ball screw 44 of the feed screw mechanism 54 via the power transmission gear 48, so as to normally rotate the ball screw 44. As the ball screw 44 normally rotates, the nut 52 linearly moves forward along the rotation axis O (leftward in FIG. 2).

simultaneously, the turret 24 fixed to the nut 52 also linearly moves forward in the axial direction, relative to the base 22, together with the nut 52. As a result, the pair of coupling elements 66, 68 in the coupling unit 70, provided between the base 22 and the turret 24, are disengaged from each other, while the pair of clutch pieces 72, 74 in the clutch unit 76 are engaged with each other, so as to enable the turret 24 to be rotationally indexed.

As the normal rotation of the coupling motor 50 continues, the clutch pieces 72, 74 of the clutch unit 76 provided in the turret tool rest 14 are fully meshed with each other, and the turret 24 is in the completely unclamped position shown in FIG. 4. When the meshing of the clutch pieces 72, 74 has been completed in this manner, a load applied to the coupling motor 50 suddenly increases, whereby a clutch-completion signal is output from the clutch sensor 122 (S5).

According to the relative movement between the turret 24 and the base 22 along the rotation axis O, a gap is inevitably formed between the teeth 66a, 68a of the coupling elements 66, 68 as well as between the teeth of the clutch pieces 72, 74, during a period from the beginning of the mutual disengagement between the coupling elements 66,.68 to the completion of the mutual engagement between the clutch pieces 72, 74. According to the present invention, the turret 24 does not rotate by means of the rotation inhibiting means described before, but can linearly move leftward in FIG. 2 along the rotation axis O, to reach the completely unclamped position without causing sliding or collision between the slanted lateral faces of the teeth in the clutch pieces 72, 74.

The CPU 100 is provided with a timer function capable of measuring a time passage from the issuance of the operation command to the coupling drive controller 114 (S6). If no clutch-completion signal is entered even after a predetermined time has lapsed, the mulfunction of the system is decided, whereby the operation of the coupling motor 50 and the Z-axis feed motor 128 are suspended and an alarm is displayed (S7).

On the other hand, if the clutch-completion signal is entered within the predetermined time, the rotation drive of the coupling motor 50 is suspended and the linear motion of the turret 24 is finished. Subsequently, an operation command is send to the indexing drive controller 116 (S8) to rotate the output shaft of the indexing motor 62 in a rotational direction and an angle which are determined by the positional relationship between a tool mounting portion 26 in the turret 24 for a tool located at the working position and another tool mounting portion 26 for a tool subsequently selected. A rotational driving force of the indexing motor 62 is transmitted to the turret 24 via the gear train 77, the ring gear 60 and the clutch pieces 72, 74 of the clutch unit 76. Due to this rotational driving force, the turret 24 is rotationally indexed to shift the selected next tool to the working position.

When the turret 24 is rotationally indexed by the rotational driving force of the indexing motor 62, the nut 52 of the feed screw mechanism 54 fixed to the-turret 24 simultaneously rotates. Then, when the relative rotation occurs between the nut. 52 and the ball screw 44, the ball screw 44 linearly moves along the rotation axis However, since the ball screw 44 is inhibited from moving along the rotation axis O by the roller bearing 46, the nut 52 will linearly move together with the turret 24 along the rotation axis O.

Also, in the case where the turret 24 moves rightward in FIG. 4 in accordance with the indexing rotation due to the above structure of the feed screw mechanism 54, the turret side coupling element 68 may interfere, while rotating, with the base side coupling element 66, whereby the indexing motor 62 is made unrotatable. Contrarily, in the case where the turret 24 moves leftward in FIG. 4 in accordance with the indexing rotation, the clutch piece 72 of the clutch unit 76, already completely meshed, is further strongly pressed to the clutch piece 74, which also makes the indexing motor 62 unrotatable.

According to this control flow, the output shaft of the coupling motor 50 is made to rotate in a predetermined direction at a predetermined rotational speed in synchronism with the output torque of the indexing motor 62 for rotationally indexing the turret 24, so as not to generate relative rotation between the ball screw 44 and the nut 52 of the feed screw mechanism 54 during the indexing rotation of the turret 24.

A ratio in the rotational speed between the indexing motor 62 and the coupling motor 50 and the rotational direction thereof are determined due to a gear ratio in the gear train connecting the indexing motor 62 to the ring gear 60 (that is, the turret 24) and the rotational direction thereof, as well as a gear ratio in the gear train connecting the coupling motor 50 to the ball screw 44 and the rotational direction thereof. Accordingly, it is preferred that such a control program is previously stored in the ROM/RAM 102.

When the indexing rotation of the turret 24 is complete, the indexing sensor 124 detects the rotational position of the indexing motor 62 and outputs an indexing-completion signal (S9).

The CPU 100 measures the time from the issuance of an operation command to the index drive controller 116 (S10). Then, if no indexing-completion signal has been entered even after a predetermined time has lapsed, a malfunction of the system is determined, whereby the operation of the indexing motor 62 is suspended and an alarm is displayed (S7).

On the other hand, if the indexing-completion signal is entered within the predetermined time, the rotation drive of the indexing motor 62 is suspended, and an operation command is issued to the coupling drive controller 114 so as to reversely rotate the coupling motor 50 (S11).

A reverse rotational driving force of the coupling motor 50 is transmitted to the ball screw 44 of the feed screw mechanism 54 via the power transmission gear 48, so as to reversely rotate the ball screw 44. As the ball screw 44 reversely rotates, the nut 52 and the turret 24 linearly move rearward in the axial direction (rightward in FIG. 2) relative to the base 22. As a result, the pair of clutch pieces 72, 74 of the clutch unit 76 are disengaged from each other and the pair of coupling elements 66, 68 of the coupling unit 70 are engaged with each other.

If the reverse rotation of the coupling motor 50 further continues, the coupling elements 66, 68 in the coupling unit 70 are fully meshed with each other and the turret 24 is placed at the completely clamped position as shown in FIG. 3. Thereby, the turret 24 is fixedly located at a desired indexed position on the base 22. When the coupling elements 66, 68 has been fully intermeshed with each other, the load applied on the coupling motor 50 suddenly increases, and the coupling-completion signal is output from the coupling sensor 120 (S11).

A gap is inevitably formed, due to the relative movement between the turret 24 and the base 22 along the rotation axis O, between the teeth of the clutch pieces 72, 74 and between the teeth 66a, 68a of the coupling elements 66, 68, during a period from the beginning of the disengagement of the clutch pieces 72, 74 from each other to the completion of the intermeshing of the coupling elements 66, 68. According to the present invention, the turret 24 is linearly movable rightward in the drawing along the rotation axis O with essentially no rotation, and can reach the completely clamped position with no sliding or collision between the slanted lateral faces 66b, 68b of the teeth 66a, 68a in the coupling elements 66, 68.

The CPU 100 measures the time from the issuance of the operation command for the reverse rotation to the coupling drive controller 114 (S13). If no coupling-completion signal is entered even after a predetermined time has lapsed, a malfunction of the system is detected, whereby an alarm is displayed (S7).

On the other hand, if the coupling-completion signal is entered within the predetermined time, the rotation drive of the coupling motor 50 is suspended and the linear motion of the turret 24 is finished. In this manner, the selection of the next tool has completed.

Subsequently, the control mode for the indexing motor 62 is switched to the mode for rotating the rotating tool 34 (T/S mode) (S14), and the output torque of the coupling motor 50 is lowered (S15).

At that time, the output torque of the coupling motor 50 operates as a pressing force between the coupling elements 66, 68 of the coupling unit 70 via the feed screw mechanism 54, so as to maintain the mutual mesh between the coupling elements 66, 68. Accordingly, it is possible to reduce the output torque of the coupling motor 50 to a level (or a keep torque) sufficient for maintaining the mesh between the coupling elements 66, 68.

In the above embodiment, since the coupling unit 70 is constituted by a so-called curvic coupling and the turret 24 is linearly movable by the feed screw mechanism 54, it is possible to sufficiently reduce the keep torque.

Through the above control flow, a series of steps for indexing the tool is finished, and the cutting process is carried out thereafter.

Figure 12:
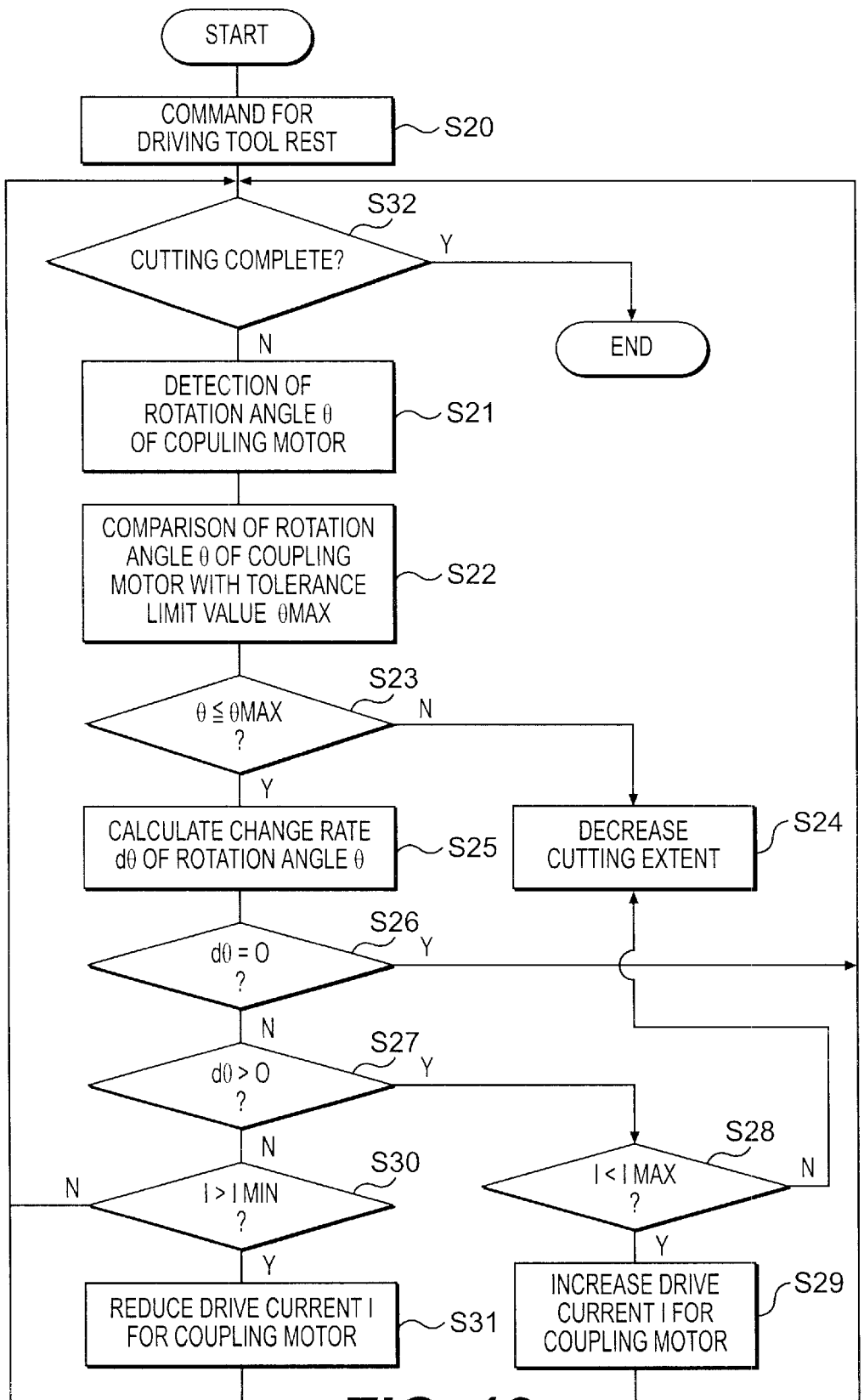
FIG. 12 is a flow chart illustrating the operation for controlling a pressing force due to a positional displacement of the turret tool rest shown in FIG. 8.

Next, with reference to FIG. 12, a control operation for the turret tool rest (or indexing device) 14 will be explained. FIG. 12 is a flow chart illustrating the control operation for the turret tool rest 14.

A drive command is issued from the CPU 100 shown in FIG. 8 to the spindle drive controller 110, so as to rotate a spindle motor (not shown) built in the headstock 12, and a drive command is issued to the tool slide drive controller 112, so as to operate the Z-axis feed motor 130 and the X-axis feed motor 132, whereby the tool slide 20 is driven to start the cutting of the workpiece W by the cutting tool 30 (S20).

When the cutting operation is performed with the cutting tool 30 being brought into contact with the workpiece W as shown in FIG. 2A, a load in a workpiece rotation direction is applied to the cutting tool 30 and the turret 24 holding the same, in accordance with various cutting conditions such as a cutting depth into the workpiece W or a feed rate of the cutting tool 30. This load in the rotation direction is transmitted to the coupling element 68 fixed to the turret 24, and acts as a load F applied in the circumferential direction between the coupling elements 66, 68 intermeshed with each other (see FIG. 5B).

Due to this circumferential load F, the turret side coupling element 68 is lifted from the base side coupling element 66 while the teeth 66a, 68a thereof slide along the slanted lateral faces 66b, 68b. As a result, the positional displacement occurs between the coupling elements 66, 68 in the rotation direction, and thereby the relative movement occurs between the base 22 and the turret 24 in the axial direction. Then, the following control is performed.

That is, when the turret 24 moves along the rotation axis O on the base 22, the coupling motor 50 is rotated via the feed screw mechanism 54 and the power transmission gear 48. This rotational angle deviation 6 is detected by the rotational angle sensor 126 shown in FIG. 8 (S21), and a detection signal is sent to the CPU 100.

Next, the comparator section 136 in the CPU 100 (see FIG. 10) compares the rotational angle deviation θ detected by the rotational angle sensor 126 with the tolerance limit value θmax previously stored in the data storage section 104 (S22), and, based on the comparison result, the load control section 138 determines whether or not the rotational angle deviation θ exceeds the tolerance limit value θmax (S23).

the rotational angle deviation θ exceeds the tolerance limit value θmax a command is issued from the pressing force control section 140 to the tool slide drive controller 112 via the central control section 134, for decreasing the feed rate of the tool slide 20 or reducing the cutting depth into the workpiece w. Thereby, a cutting extent by the cutting tool 30, which is the source of the load, is reduced, so as to lower the load applied to the turret 24 (524).

On the other hand, if the rotational angle deviation θ does not exceeds the tolerance limit value θmax the pressing force control section 140 in the CPU 100 calculates the change rate dθ, for an elapsed time, of the rotational angle deviation θ on the basis of a detection signal detected by the rotational angle sensor 126 (S25), and it is determined on the basis of this change rate dθ whether the rotational angle deviation θ, i.e., a linear displacement of the turret 24, tends to increase or decrease.

For example, if the change rate dθ =0 (S26), the pressing force applied to the pair of coupling elements 66, 68 in the coupling unit 70 in the mutually approaching direction is in equilibrium with the torque applied to the turret 24 due to the cutting resistance applied to the cutting tool 30 from the workpiece w during the cutting operation, since there is no change, in an elapsed time, in the rotational angle deviation O. Under this condition, the automatically operated lathe can perform the cutting operation as commanded. Therefore, the routine proceeds to step S32, and the control flow shown in FIG. 12 continues until the cutting operation has completed.

On the other hand, if the change rate dθ >0 (S27), it is determined that the rotational angle deviation θ is increasing, whereby the drive current I for the coupling motor 50 is increased to a proper value not exceeding the allowable maximum value Imax (S28), so as to increase the torque of the coupling motor 50 in the reverse direction (i.e., in the direction for mutually approaching the coupling elements 66, 68) (S29). Thereby, the pressing force acting between the coupling elements 66, 68 is increased, and the increasing tendency of the positional displacement is eliminated. Thereafter, the routine proceeds to step S32, and the control flow continues until the cutting operation has completed.

In the control when the rotational angle deviation θ is the increasing tendency, if the drive current I of the coupling motor 50 exceeds the allowable maximum value Imax (S28), a command is issued from the pressing force control section 140 to the tool slide drive controller 112 via the central control section 134, for decreasing the feed rate of the tool slide 20 or reducing the cutting depth into the workpiece W, so that the cutting extent by the cutting tool 30 which is a load generation source is reduced, so as to decrease the load applied to the turret 24 (S24). Thereafter, the routine proceeds to step S32, and the control flow continues until the cutting operation has completed.

If the change rate dθ<0 (S27), it is determined that the rotational angle deviation θ is decreasing, whereby the drive current I for the coupling motor 50 is decreased to a proper value not lower than the allowable minimum value Imin (S30), so as to reduce the torque of the coupling motor 50 in the reverse direction (i.e., in the direction for mutually approaching the coupling elements 66, 68) (S31). Thereby, the pressing force excessively acting between the coupling elements 66, 68 is reduced, and the decreasing tendency of the positional displacement is eliminated. Thereafter, the routine proceeds to step S32, and the control flow continues until the cutting operation has completed.

In the control when the rotational angle deviation θ is the decreasing tendency, if the drive current I of the coupling motor 50 becomes smaller than the allowable minimum value Imin (S30), the routine proceeds to step S32 without adjusting the drive current I for the coupling motor 50, and the control flow continues until the cutting operation has completed.

In this regard, in the above embodiment, although the feed screw mechanism 54 and the coupling motor 50 are used for constituting the drive means for moving the coupling elements 66, 68, as the engaging elements of the indexing device, between the engaged position and the disengaged position, that is, means for applying a pressing force to the coupling elements 66, 68 in the mutual approaching direction, as described in the abovesaid control flow, an actuator such as a hydraulic cylinder or a pneumatic cylinder may be alternatively used for constituting the drive means.

In the above control flow, although it is intended to reduce the load applied to the turret 24 by decreasing the cutting extent or the cutting resistance by the cutting tool 30 in the case where the rotational angle deviation θ exceeds the tolerance limit value θmax or where the drive current I for the coupling motor 50 exceeds the allowable maximum value Imax, it is also possible to immediately separate the cutting tool 30 from the workpiece to make the turret 24 free from the load, if there might be a risk of damaging the device.

Further, in the above control flow, although it is intended to reduce the load applied to the turret 24 if the rotational angle deviation θ exceeds the tolerance limit value θmax it is also possible to decrease the load applied to the turret 24 if the rotational angle deviation θ exceeds the proper value θo.

According to the above control flow, the pressing force to be applied to the coupling elements 66, 68, which are engaging elements of the indexing device, is properly controlled in accordance with the load applied to the turret 24, whereby it is possible to reduce the wear of the teeth 66$a$, 68$a$ of the coupling elements 66, 68 as well as to suppress the heat generation of the drive source for applying the pressing force to the coupling elements 66, 68.

When the present invention is applied to the turret tool rest as described in the above embodiment, the cutting load as well as the load applied to the turret 24 vary in accordance with machining processes, Even in such a case, it is possible to maintain the pressing force given to the coupling elements 66, 68 in a proper extent.

Further, in a case of the turret tool rest, it is possible for the positional displacement generated between the coupling elements 66, 68 not to exceed the tolerance limit value without suspending the cutting operation, by reducing the cutting extent by the cutting tool 30 or decreasing the feed rate of the cutting tool 30, whereby the working efficiency can be improved.

In general, it is more preferred in this case to decrease the feed rate of the cutting tool 30, because it is unnecessary to change a moving path of the cutting tool designated by the machining program, and therefore the control becomes simple. In this regard, the cutting extent by the cutting tool 30 may preferably be reduced, in the case where, e.g., a threading process or a plurality of machining processes are simultaneously carried out.

INDUSTRIAL APPLICABILITY

The present invention may be applied to an indexing device, for example, for a turret tool rest used for a machine tool, and thereby it is possible to surely prevent the positional displacement in the rotational direction between a plurality of engaging elements for fixedly holding a rotary unit at an indexed position, until the mutual engagement of the engaging elements has completed. Thereby, it is possible to effectively prevent the engaging elements, which are required to have a highly accurate positioning function, from wearing or breaking.

What is claimed is:

1. A turret tool rest comprising:
   a base;
   a turret movably supported on said base, on which desired tools, including a rotating tool, can be mounted at predetermined indexable angled positions;
   a first servo motor for driving said rotating tool;
   a pair of clutch pieces, one of which is operatively connected to said first servo motor and the other of which is operatively connected to said turret;
   a pair of coupling elements provided in respective association with said base and said turret and engageable with each other;
   a second servo motor for moving said pair of clutch pieces between an operative position at which said clutch pieces are engaged with each other and transmit a driving force of said first servo motor to said turret so as to rotationally index said turret and a non-operative position at which said clutch pieces are disengaged from each other so as to separate said turret from said first servo motor, and for moving said pair of coupling elements between an engaged position at which said coupling elements are engaged with each other and hold said turret at in respective indexed positions on said base and a disengaged position at which said coupling elements are disengaged from each other to permit said turret to be rotationally indexed;
   an interlocking mechanism for interlocking said clutch piece with said coupling element in operation, so that said pair of coupling elements move to said engaged position when said pair of clutch pieces move to said non-operative position, while said pair of coupling elements move to said disengaged position when said pair of clutch pieces move to said operative position; and
   rotation inhibiting means for preventing said turret from freely rotating on said base during moving operations of said pair of clutch pieces between said non-operative position and said operative position and simultaneously of said pair of coupling elements between said engaged position and said disengaged position;
   wherein said rotation inhibiting means comprises at least one movable projection retractably provided on said turret, at least one engaging portion fixedly provided on said base to be engaged with said at least one movable projection when said turret is located at said indexed position, and biasing means for biasing said at least one movable projection in a direction for maintaining an engagement of said at least one movable projection with said at least one engaging portion.

2. A turret tool rest as defined by claim 1, wherein said at least one movable projection includes an outwardly convexly curved end surface, and wherein said at least one engaging portion comprises a countersink provided on a surface of said base so as to receive said end surface of said at least one movable projection.

3. A turret tool rest as defined by claim 1, wherein said at least one movable projection comprises a plunger axially slidably supported in a sleeve provided in said turret.

4. A turret tool rest as defined by claim 1, wherein said biasing means comprises a spring.

5. A turret tool rest as defined by claim 1, wherein said rotation inhibiting means further comprises a friction member provided between said base and said turret.

6. A turret tool rest as defined by claim 1, wherein said pair of coupling elements comprise a plurality of stationary teeth fixedly provided on said base and a plurality of rotary teeth fixedly provided on said turret, and wherein said second servo motor linearly moves said turret along a rotation axis of said turret on said base, so as to move said stationary teeth and said rotary teeth between said engaged position and said disengaged position.

7. A turret tool rest as defined by claim 6, wherein said stationary teeth and said rotary teeth have respective slanted lateral faces capable of closely contacting with each other, and wherein said rotation inhibiting means inhibits said turret from freely rotating on said base during the moving operation of said stationary teeth and said rotary teeth between said engaged position at which said slanted lateral faces of said stationary teeth and said rotary teeth are closely contacted with each other and said disengaged position at which said slanted lateral faces are disengaged from each other to an extent allowing a rotation of said rotary teeth without interfering with said stationary teeth.

* * * * *